(12) United States Patent
Chen et al.

(10) Patent No.: US 12,265,205 B2
(45) Date of Patent: Apr. 1, 2025

(54) OPTICAL IMAGING SYSTEM ASSEMBLY, IMAGING APPARATUS AND ELECTRONIC DEVICE

(71) Applicant: LARGAN PRECISION CO., LTD., Taichung (TW)

(72) Inventors: Chun-Yen Chen, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 505 days.

(21) Appl. No.: 17/718,445

(22) Filed: Apr. 12, 2022

(65) Prior Publication Data

US 2023/0070553 A1 Mar. 9, 2023

(30) Foreign Application Priority Data

Sep. 8, 2021 (TW) ................... 110133479

(51) Int. Cl.
*G02B 13/00* (2006.01)
*G02B 9/64* (2006.01)
*G02B 13/18* (2006.01)

(52) U.S. Cl.
CPC ........... *G02B 13/0045* (2013.01); *G02B 9/64* (2013.01); *G02B 13/18* (2013.01)

(58) Field of Classification Search
CPC ....... G02B 13/0045; G02B 13/18; G02B 9/64
USPC ................. 359/708, 713, 754, 755
See application file for complete search history.

(56) References Cited

U.S. PATENT DOCUMENTS

| | | | |
|---|---|---|---|
| 2016/0241756 A1 | 8/2016 | Chen | |
| 2018/0188485 A1 | 7/2018 | Fan et al. | |
| 2018/0348484 A1 | 12/2018 | Chen et al. | |
| 2019/0154974 A1 | 5/2019 | Chen | |
| 2019/0187414 A1* | 6/2019 | Zhang | G02B 9/62 |
| 2019/0187432 A1* | 6/2019 | Chen | G02B 9/64 |
| 2019/0196144 A1 | 6/2019 | Chen et al. | |
| 2019/0204554 A1 | 7/2019 | Liu et al. | |
| 2020/0209547 A1* | 7/2020 | Bian | G02B 13/0045 |
| 2020/0209589 A1* | 7/2020 | Chen | G02B 9/62 |

(Continued)

FOREIGN PATENT DOCUMENTS

| | | |
|---|---|---|
| CN | 110346896 A | 10/2019 |
| CN | 111538142 A | 8/2020 |

(Continued)

*Primary Examiner* — Wyatt A Stoffa
*Assistant Examiner* — Seth D Moser
(74) *Attorney, Agent, or Firm* — McClure, Qualey & Rodack, LLP

(57) ABSTRACT

An optical imaging system assembly includes seven lens elements, which are, in order from an object side to an image side along an optical path, a first lens element, a second lens element, a third lens element, a fourth lens element, a fifth lens element, a sixth lens element and a seventh lens element. The second lens element has negative refractive power. An object-side surface of the third lens element is convex in a paraxial region thereof. An image-side surface of the fifth lens element is convex in a paraxial region thereof. The sixth lens element has negative refractive power, an object-side surface of the sixth lens element is convex in a paraxial region thereof, an image-side surface of the sixth lens element is concave in a paraxial region thereof. The seventh lens element has negative refractive power.

27 Claims, 26 Drawing Sheets

(56) References Cited

U.S. PATENT DOCUMENTS

| | | |
|---|---|---|
| 2020/0271897 A1 | 8/2020 | Huh et al. |
| 2021/0109316 A1 | 4/2021 | Jhang et al. |
| 2021/0149166 A1 | 5/2021 | Zhang et al. |
| 2022/0011549 A1 | 1/2022 | Peng |
| 2024/0094507 A1* | 3/2024 | Lee .......................... G02B 9/64 |

FOREIGN PATENT DOCUMENTS

| | | |
|---|---|---|
| CN | 112748524 A | 5/2021 |
| CN | 112748533 A | 5/2021 |
| CN | 112748535 A | 5/2021 |
| CN | 112904541 A | 6/2021 |
| CN | 113126248 A | 7/2021 |
| CN | 113267877 A | 8/2021 |
| CN | 113281877 A | 8/2021 |
| CN | 113281878 A | 8/2021 |
| CN | 214845995 U | 11/2021 |
| CN | 216310385 U | 4/2022 |
| CN | 114690371 A | 7/2022 |
| WO | 2022/104603 A1 | 5/2022 |
| WO | 2022178657 A1 | 9/2022 |

* cited by examiner

OPTICAL IMAGING SYSTEM ASSEMBLY, IMAGING APPARATUS AND ELECTRONIC DEVICE

RELATED APPLICATIONS

This application claims priority to Taiwan Application Serial Number 110133479, filed Sep. 8, 2021, which is herein incorporated by reference.

BACKGROUND

Technical Field

The present disclosure relates to an optical imaging system assembly and an imaging apparatus. More particularly, the present disclosure relates to an optical imaging system assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an optical imaging system assembly that meets the aforementioned needs.

SUMMARY

According to one aspect of the present disclosure, an optical imaging system assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The second lens element has negative refractive power. The object-side surface of the third lens element is convex in a paraxial region thereof. The image-side surface of the fifth lens element is convex in a paraxial region thereof. The sixth lens element has negative refractive power, the object-side surface of the sixth lens element is convex in a paraxial region thereof, the image-side surface of the sixth lens element is concave in a paraxial region thereof. The seventh lens element has negative refractive power. At least one of the object-side surface and the image-side surface of at least one of the first lens element to the seventh lens element includes at least one inflection point. When an Abbe number of the fourth lens element is V4, an Abbe number of the fifth lens element is V5, an Abbe number of the sixth lens element is V6, an axial distance between the first lens element and the second lens element is T12, and an axial distance between the second lens element and the third lens element is T23, the following conditions are satisfied: $4.4 < (V5+V6)/V4 < 12$; and $0.70 < T23/T12 < 3.6$.

According to one aspect of the present disclosure, an optical imaging system assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The first lens element has positive refractive power. The object-side surface of the third lens element is convex in a paraxial region thereof. The fifth lens element has positive refractive power, the object-side surface of the fifth lens element is concave in a paraxial region thereof, the image-side surface of the fifth lens element is convex in a paraxial region thereof. The object-side surface of the seventh lens element is concave in a paraxial region thereof. At least one of the object-side surface and the image-side surface of at least one of the first lens element to the seventh lens element includes at least one inflection point. When an Abbe number of the fourth lens element is V4, an Abbe number of the fifth lens element is V5, an Abbe number of the sixth lens element is V6, an axial distance between the second lens element and the third lens element is T23, and an axial distance between the sixth lens element and the seventh lens element is T67, the following conditions are satisfied: $5.3 < (V5+V6)/V4 < 10$; and $2.1 < T67/T23 < 5.4$.

According to one aspect of the present disclosure, an optical imaging system assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side. The object-side surface of the first lens element is convex in a paraxial region thereof, the image-side surface of the first lens element is concave in a paraxial region thereof. The object-side surface of the third lens element is convex in a paraxial region thereof. The fifth lens element has positive refractive power. The sixth lens element has negative refractive power. The seventh lens element has negative refractive power. At least one of the object-side surface and the image-side surface of at least one of the first lens element to the seventh lens element includes at least one inflection point. When an Abbe number of the fourth lens element is V4, an Abbe number of the fifth lens element is V5, an Abbe number of the sixth lens element is V6, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and an axial distance between the sixth lens element and the seventh lens element is T67, the following conditions are satisfied: $4.4 < (V5+V6)/V4 < 12$; and $1.0 < (CT1+CT2+CT3+CT4+CT5+CT6)/T67 < 3.5$.

According to one aspect of the present disclosure, an imaging apparatus includes the optical imaging system assembly of the aforementioned aspect and an image sensor, wherein the image sensor is disposed on an image surface of the optical imaging system assembly.

According to one aspect of the present disclosure, an electronic device includes the imaging apparatus of the aforementioned aspect.

DETAILED DESCRIPTION

Figure 1:
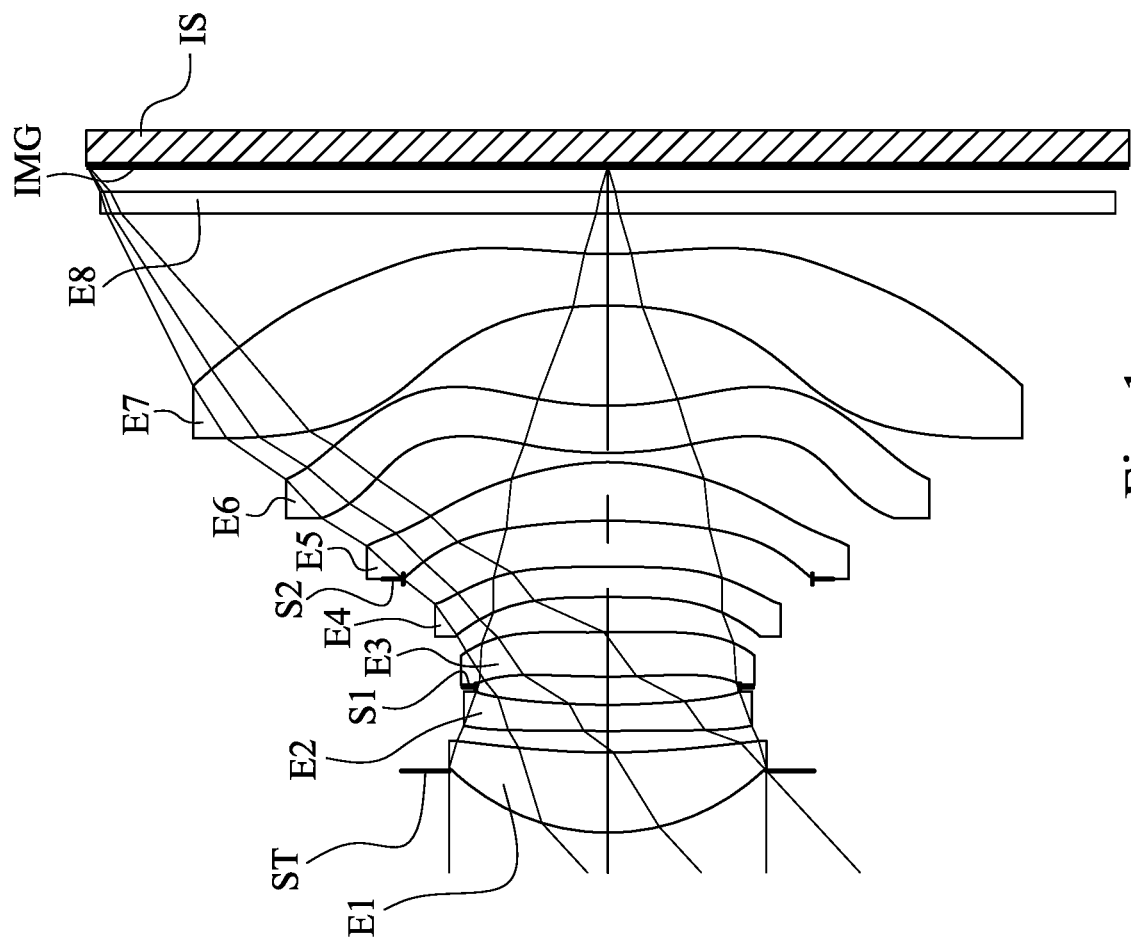
FIG. 1 is a schematic view of an imaging apparatus according to the 1st embodiment of the present disclosure.

An optical imaging system assembly includes seven lens elements, the seven lens elements being, in order from an object side to an image side along an optical path, a first lens element, a second lens element, a third lens element, a fourth lens element, a fifth lens element, a sixth lens element and a seventh lens element. Each of the seven lens elements has an object-side surface towards the object side and an image-side surface towards the image side.

The first lens element can have positive refractive power, which is favorable for compressing the volume of the object side of the optical imaging system assembly. The object-side surface of the first lens element can be convex in a paraxial region thereof, so that the direction of the light entering into the optical imaging system assembly can be adjusted so as to enlarge field of view. The image-side surface of the first lens element can be concave in a paraxial region thereof, so that it is favorable for correcting aberrations, such as astigmatism etc., by adjusting the surface shape of the first lens element.

The second lens element can have negative refractive power, which can be cooperated with the first lens element so as to correct aberrations, such as spherical aberrations etc. The image-side surface of the second lens element can be concave in a paraxial region thereof, so that it is favorable for correcting aberrations by adjusting the surface shape and refractive power of the second lens element.

The object-side surface of the third lens element is convex in a paraxial region thereof, so that it is favorable for correcting aberrations, such as spherical aberrations etc., by adjusting the surface shape of the third lens element.

The fifth lens element can have positive refractive power, which is favorable for compressing the volume of the image side of the optical imaging system assembly. The object-side surface of the fifth lens element can be concave in a paraxial region thereof, so that it is favorable for balancing the volume arrangement of the optical imaging system assembly by adjusting the traveling direction of the light. The image-side surface of the fifth lens element can be convex in a paraxial region thereof, so that it is favorable for enlarging the image surface by adjusting the traveling direction of the light.

The sixth lens element can have negative refractive power, which can be cooperated with the fifth lens element so as to correct aberrations. The object-side surface of the sixth lens element can be convex in a paraxial region thereof, so that it is favorable for correcting aberrations by adjusting the surface shape of the sixth lens element. The image-side surface of the sixth lens element can be concave in a paraxial region thereof, which can be cooperated with the seventh lens element so as to correct aberrations.

The seventh lens element can have negative refractive power, so that it is favorable for correcting aberrations by balancing the refractive power of the image side of the optical imaging system assembly. The object-side surface of the seventh lens element can be concave in a paraxial region thereof, so that it is favorable for enlarging the image surface by adjusting the traveling direction of the light. The image-side surface of the seventh lens element can be concave in a paraxial region thereof, so that it is favorable for reducing the back focal length.

At least one of the object-side surface and the image-side surface of at least one of the first lens element to the seventh lens element includes at least one inflection point. Therefore, it is favorable for correcting aberrations and compressing the size of the lens elements by increasing the variation of the surfaces of the lens elements. Further, at least one of the object-side surface and the image-side surface of each of at least two of the first lens element to the seventh lens element can include at least one inflection point. Furthermore, at least one of the object-side surface and the image-side surface of each of at least three of the first lens element to the seventh lens element can include at least one inflection point.

The object-side surface of the sixth lens element can have at least one critical point in an off-axis region thereof, so that it is favorable for reducing the surface reflection and correcting off-axis aberrations by adjusting the surface shape of the sixth lens element. When a distance between the at least one critical point of the object-side surface of the sixth lens element and an optical axis is Yc61, and a maximum distance between an optical effective region of the object-side surface of the sixth lens element and the optical axis is Y61, the following condition is satisfied: $0.30<Yc61/Y61<0.75$. Therefore, the surface shape of the sixth lens element can be further adjusted so as to correct aberrations.

The image-side surface of the sixth lens element can have at least one critical point in an off-axis region thereof, so that it is favorable for correcting off-axis aberrations, such as field curvature etc., by adjusting the surface shape of the sixth lens element. When a distance between the at least one critical point of the image-side surface of the sixth lens element and the optical axis is Yc62, and a maximum distance between an optical effective region of the image-side surface of the sixth lens element and the optical axis is Y62, the following condition is satisfied: $0.25<Yc62/Y62<0.70$. Therefore, the surface shape of the sixth lens element can be further adjusted so as to correct aberrations.

The image-side surface of the seventh lens element can have at least one critical point in an off-axis region thereof, so that it is favorable for enhancing the image quality and the response efficiency of the image sensor by adjusting the incident angle of the light on the image surface. When a distance between the at least one critical point of the image-side surface of the seventh lens element and the optical axis is Yc72, and a maximum distance between an optical effective region of the image-side surface of the seventh lens element and the optical axis is Y72, the following condition is satisfied: $0.10<Yc72/Y72<0.50$. Therefore, the image quality can be further enhanced.

When an Abbe number of the fourth lens element is V4, an Abbe number of the fifth lens element is V5, and an Abbe number of the sixth lens element is V6, the following condition is satisfied: $4.4<(V5+V6)/V4<12$. Therefore, it is favorable for correcting aberrations, such as chromatic aberrations etc., by cooperating the material of the lens elements. Further, the following condition can be satisfied: $4.9<(V5+V6)/V4<11$. Furthermore, the following condition can be satisfied: $5.3<(V5+V6)/V4<10$. Moreover, the following condition can be satisfied: $5.7<(V5+V6)/V4<9.0$.

When an axial distance between the first lens element and the second lens element is T12, and an axial distance between the second lens element and the third lens element is T23, the following condition is satisfied: $0.70<T23/T12<3.6$. Therefore, it is favorable for compressing the volume of the object side of the optical imaging system assembly by adjusting the lens element arrangement of the object side thereof. Further, the following condition can be satisfied: $0.90<T23/T12<2.4$. Furthermore, the following condition can be satisfied: $1.1<T23/T12<1.8$.

When the axial distance between the second lens element and the third lens element is T23, and an axial distance between the sixth lens element and the seventh lens element is T67, the following condition is satisfied: $2.1<T67/T23<5.4$. Therefore, it is favorable for compressing the volume of the optical imaging system assembly by adjusting the lens element arrangement thereof. Further, the following condition can be satisfied: $2.4<T67/T23<4.8$. Furthermore, the following condition can be satisfied: $2.7<T67/T23<4.3$.

When a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and the axial distance between the sixth lens element and the seventh lens element is T67, the following condition is satisfied: $1.0<(CT1+CT2+CT3+CT4+CT5+CT6)/T67<3.5$. Therefore, it is favorable for compressing the volume of the optical imaging system assembly by adjusting the lens element arrangement thereof. Further, the following condition can be satisfied: $2.0<(CT1+CT2+CT3+CT4+CT5+CT6)/T67<3.2$.

When a sum of all axial distances between adjacent lens elements of the optical imaging system assembly is ΣAT, and the axial distance between the second lens element and the third lens element is T23, the following condition is satisfied: $5.5<\Sigma AT/T23<14$. Therefore, it is favorable for balancing the distribution of the volume of the optical imaging system assembly by adjusting the lens element arrangement thereof. Further, the following condition can be satisfied: $6.5<\Sigma AT/T23<11$.

When the sum of all axial distances between adjacent lens elements of the optical imaging system assembly is ΣAT, and a sum of central thicknesses of all lens elements of the optical imaging system assembly is ΣCT, the following condition is satisfied: $1.3<\Sigma CT/\Sigma AT<1.6$. Therefore, it is favorable for compressing the total track length of the optical imaging system assembly by adjusting the lens element arrangement thereof.

When a focal length of the optical imaging system assembly is f, and a focal length of the second lens element is f2, the following condition is satisfied: $-3.5<f2/f<-2.0$. Therefore, it is favorable for correcting aberrations by adjusting the refractive power of the second lens element.

When a focal length of the sixth lens element is f6, a curvature radius of the object-side surface of the sixth lens element is R11, and a curvature radius of the image-side surface of the sixth lens element is R12, the following condition is satisfied: $-25<f6/R11+f6/R12<-18$. Therefore, it is favorable for correcting aberrations by adjusting the surface shape and the refractive power of the sixth lens element.

When an f-number of the optical imaging system assembly is Fno, the following condition is satisfied: $1.3<Fno<2.4$. Therefore, it is favorable for balancing the illumination and the depth of field.

When half of a maximum field of view of the optical imaging system assembly is HFOV, the following condition is satisfied: $35.0$ degrees$<HFOV<50.0$ degrees. Therefore, the optical imaging system assembly can obtain characteristic of wide field of view, and aberrations, such as distortion etc., due to the excessive field of view can be reduced. Further, the following condition can be satisfied: $37.5$ degrees$<HFOV<45.0$ degrees.

When a focal length of the first lens element is f1, and the focal length of the sixth lens element is f6, the following condition is satisfied: $-13<f6/f1<-6.7$. Therefore, the arrangement of refractive power of the optical imaging system assembly can be adjusted, so that it is favorable for obtaining the balance among field of view, volume and image quality. Further, the following condition can be satisfied: $-10<f6/f1<-7.1$.

When the focal length of the optical imaging system assembly is f, a focal length of the third lens element is f3, and a focal length of the fourth lens element is f4, the following condition is satisfied: $|f/f3|+|f/f4|<0.75$. Therefore, it is favorable for balancing the arrangement of refractive power on the object side and the image side of the optical imaging system assembly by cooperating the third lens element and the fourth lens element. Further, the following condition can be satisfied: $|f/f3|+|f/f4|<0.60$.

When an axial distance between the object-side surface of the first lens element and the image surface is TL, and an entrance pupil diameter of the optical imaging system assembly is EPD, the following condition is satisfied: $1.8<TL/EPD<2.5$. Therefore, it is favorable for obtaining the balance between the total track length and the aperture size.

When the axial distance between the object-side surface of the first lens element and an image surface is TL, and a maximum image height of the optical imaging system assembly is ImgH, the following condition is satisfied: $1.0<TL/ImgH<1.6$. Therefore, it is favorable for obtaining the balance between the compression of the total track length and the enlargement of the image surface, and is favorable for enlarging field of view.

When the focal length of the first lens element is f1, a curvature radius of the object-side surface of the first lens element is R1, and a curvature radius of the image-side surface of the first lens element is R2, the following condition is satisfied: $2.9<f1/R1+f1/R2<3.6$. Therefore, it is favorable for compressing the volume and enlarging the field of view by adjusting the surface shape and refractive power of the first lens element.

When the axial distance between the object-side surface of the first lens element and the image surface is TL, and the focal length of the optical imaging system assembly is f, the following condition is satisfied: $1.1<TL/f<1.4$. Therefore, it is favorable for obtaining the balance between the compression of the total track length and the enlargement of field of view.

When the focal length of the optical imaging system assembly is f, and a focal length of the fifth lens element is f5, the following condition is satisfied: $0.90<f5/f<1.4$. Therefore, it is favorable for compressing the volume by adjusting the refractive power of the fifth lens element.

When a focal length of the seventh lens element is f7, a curvature radius of the object-side surface of the seventh lens element is R13, and a curvature radius of the image-side surface of the seventh lens element is R14, the following condition is satisfied: $-1.2<f7/R13+f7/R14<0$. Therefore, it is favorable for correcting aberrations by adjusting the surface shape and the refractive power of the seventh lens element. Further, the following condition can be satisfied: $-0.80<f7/R13+f7/R14<-0.10$. Furthermore, the following condition can be satisfied: $-0.50<f7/R13+f7/R14<-0.20$.

When a maximum distance between an optical effective region of the object-side surface of the first lens element and the optical axis is Y11, and the maximum distance between the optical effective region of the image-side surface of the seventh lens element and the optical axis is Y72, the following condition is satisfied: $2.0<Y72/Y11<4.0$. Therefore, it is favorable for obtaining the balance among field of view, size of the image surface and the volume arrangement by adjusting the traveling direction of the light.

Each of the aforementioned features of the optical imaging system assembly can be utilized in various combinations for achieving the corresponding effects.

According to the optical imaging system assembly of the present disclosure, the lens elements thereof can be made of glass or plastic materials. When the lens elements are made of glass materials, the distribution of the refractive power of the optical imaging system assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the optical imaging system assembly. Therefore, the total track length of the optical imaging system assembly can also be reduced. The aspheric surfaces may be formed by a plastic injection molding method, a glass molding method or other manufacturing methods.

According to the optical imaging system assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for lights in a wavelength range of 600 nm-800 nm in the optical imaging system assembly so as to reduce extra red light or infrared lights, or the additives can have the absorption ability for lights in a wavelength range of 350 nm-450 nm in the optical imaging system assembly so as to reduce blue light or ultraviolet lights. Therefore, additives can prevent the image from interfering by lights in a particular wavelength range. Furthermore, the additives can be homogeneously mixed with the plastic material, and the lens elements can be made by the injection molding method. Moreover, the additives can be coated on the lens surfaces to provide the aforementioned effects.

According to the optical imaging system assembly of the present disclosure, when a surface of the lens element is aspheric, it indicates that entire optical effective region of the surface of the lens element or a part thereof is aspheric.

According to the optical imaging system assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the optical imaging system assembly of the present disclosure, if the lens element has positive refractive power or negative refractive power, or the focal length of the lens element, all can be referred to the refractive power, or the focal length, in the paraxial region of the lens element.

According to the optical imaging system assembly of the present disclosure, a critical point is a non-axial point of the lens surface where its tangent is perpendicular to the optical axis; an inflection point is a point on a lens surface with a curvature changing from positive to negative or from negative to positive.

According to the optical imaging system assembly of the present disclosure, the image surface thereof, based on the corresponding image sensor, can be flat or curved. In particular, the image surface can be a concave curved surface facing towards the object side. Furthermore, the optical imaging system assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 22A:
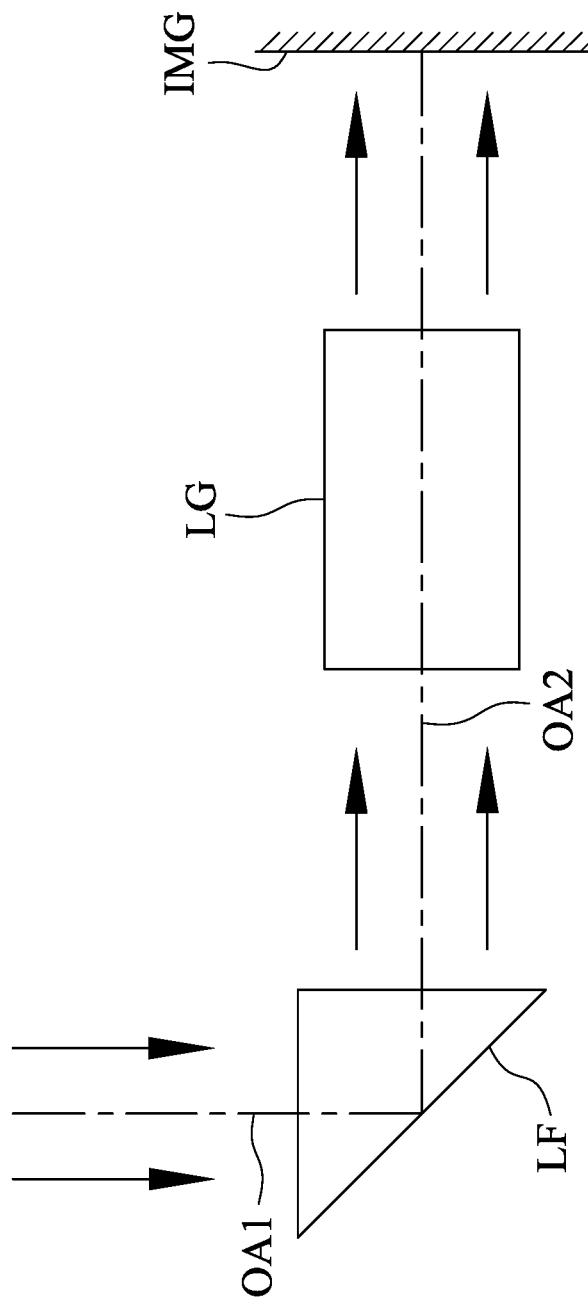
FIG. 22A is a schematic view of an arrangement of a light path folding element in the optical imaging system assembly of the present disclosure.
Figure 22B:
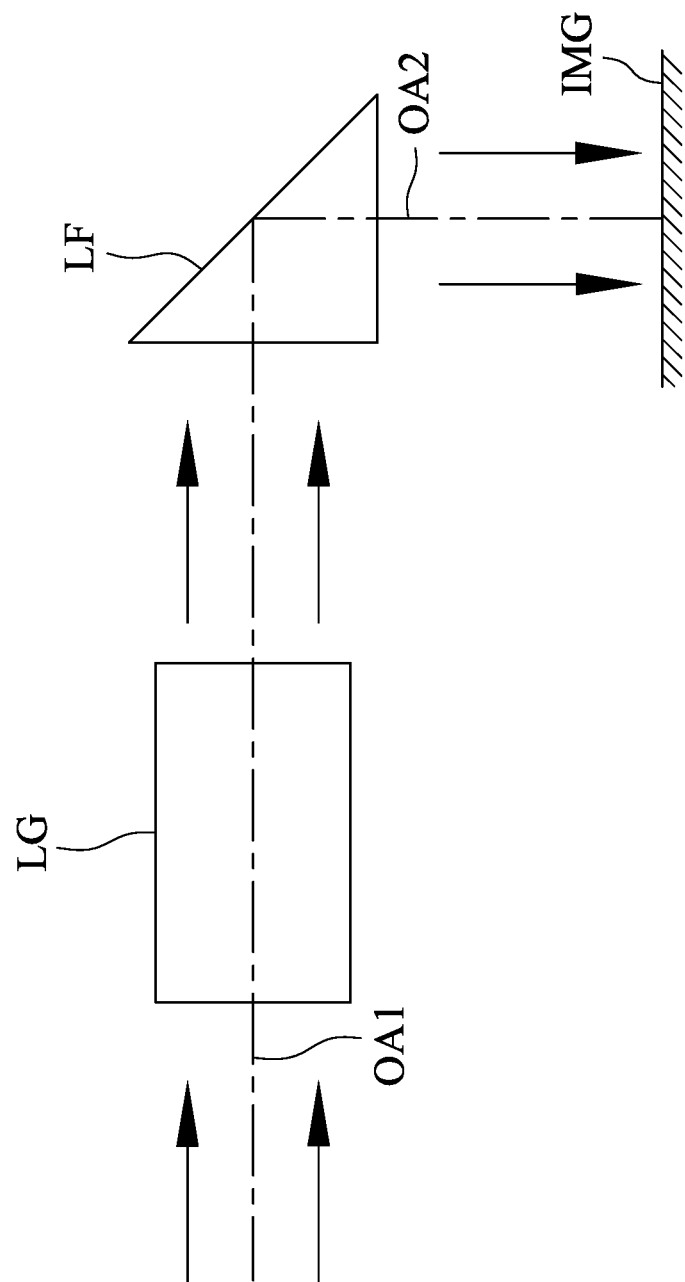
FIG. 22B is a schematic view of another arrangement of the light path folding element in the optical imaging system assembly of the present disclosure.
Figure 22C:
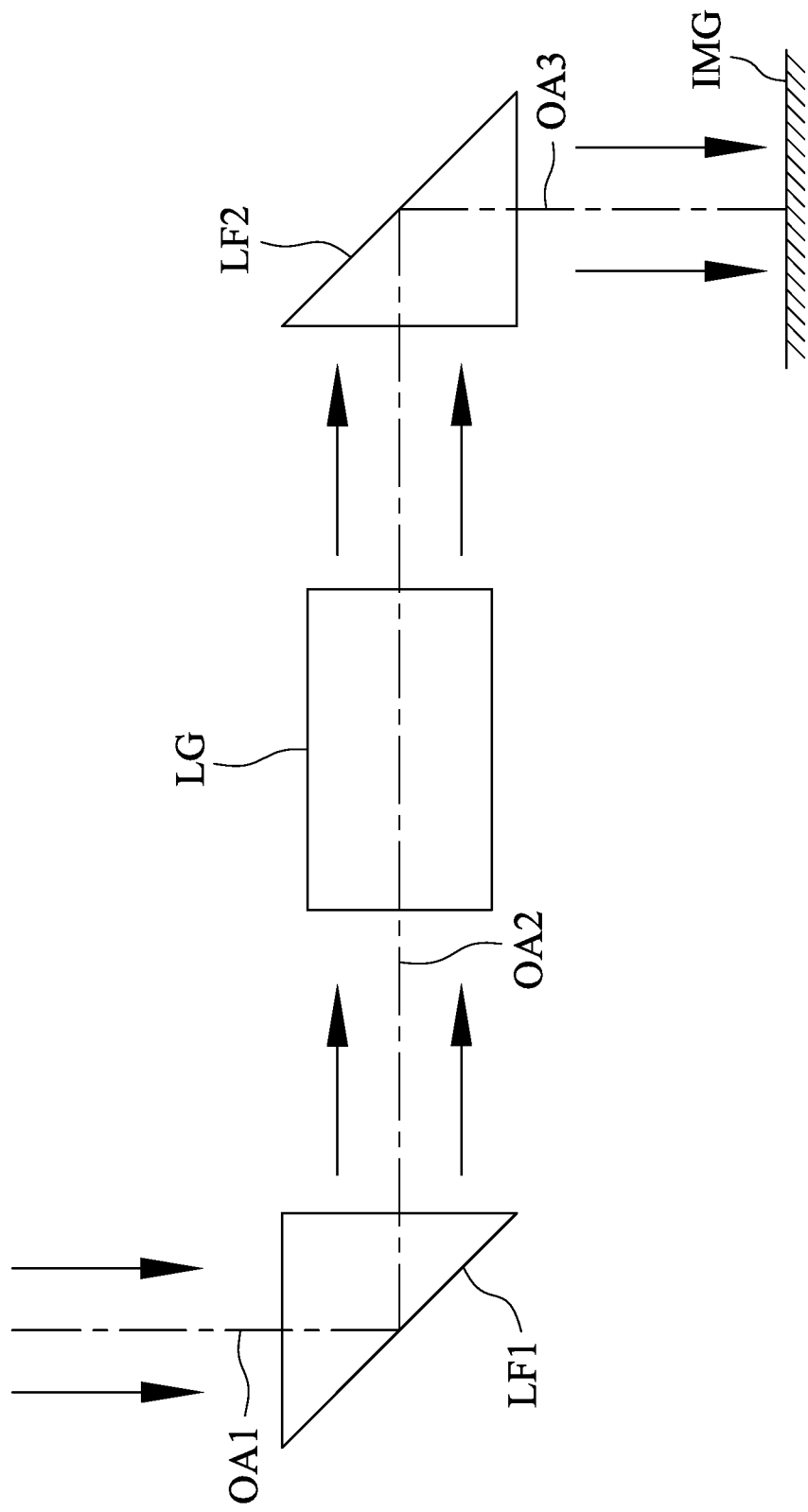
FIG. 22C is a schematic view of an arrangement of two light path folding elements in the optical imaging system assembly of the present disclosure.

According to the optical imaging system assembly of the present disclosure, at least one element with light path folding function can be selectively disposed between the imaged object and the image surface, such as a prism or a mirror, etc. Therefore it is favorable for providing high flexible space arrangement of the optical imaging system assembly, so that the compactness of the electronic device would not be restricted by the optical total track length of the optical imaging system assembly. FIG. 22A is a schematic view of an arrangement of a light path folding element LF in the optical imaging system assembly of the present disclosure. FIG. 22B is a schematic view of another arrangement of the light path folding element LF in the optical imaging system assembly of the present disclosure. As shown in FIGS. 22A and 22B, the optical imaging system assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the optical imaging system assembly as shown in FIG. 22A, or can be disposed between the lens group LG of the optical imaging system assembly and the image surface IMG as shown in FIG. 22B. Moreover, FIG. 22C is a schematic view of an arrangement of two light path folding elements LF1, LF2 in the optical imaging system assembly of the present disclosure. As shown in FIG. 22C, the optical imaging system assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the optical imaging system assembly, and the light path folding element LF2 is disposed between the lens group LG of the optical imaging system assembly and the image surface IMG. The optical imaging system assembly can also be selectively disposed with three or more light path folding element, the type, amount and location of the light path folding element will not be limited to the present disclosure.

Furthermore, according to the optical imaging system assembly of the present disclosure, the optical imaging system assembly can include at least one stop, such as an aperture stop, a glare stop or a field stop, for eliminating stray light and thereby improving image resolution thereof.

According to the optical imaging system assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the optical imaging system assembly and the image surface can be obtained, and thereby obtains a telecentric effect and improves the image-sensing efficiency of the image sensor, such as CCD or CMOS. The middle stop is favorable for enlarging the field of view of the optical imaging system assembly and thereby provides a wider field of view for the same.

According to the optical imaging system assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the optical imaging system assembly according to the present disclosure, so as to moderate the image quality by changing f-number such as changing the depth of field or the exposure speed.

According to the optical imaging system assembly of the present disclosure, the optical imaging system assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned optical imaging system assembly and an image sensor is provided, wherein the image sensor is disposed on the image surface of the optical imaging system assembly. By arranging refractive power and surface shapes of the lens elements, it is favorable for enlarging field of view and compressing the volume so as to achieve the goal of wide field of view and compactness. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
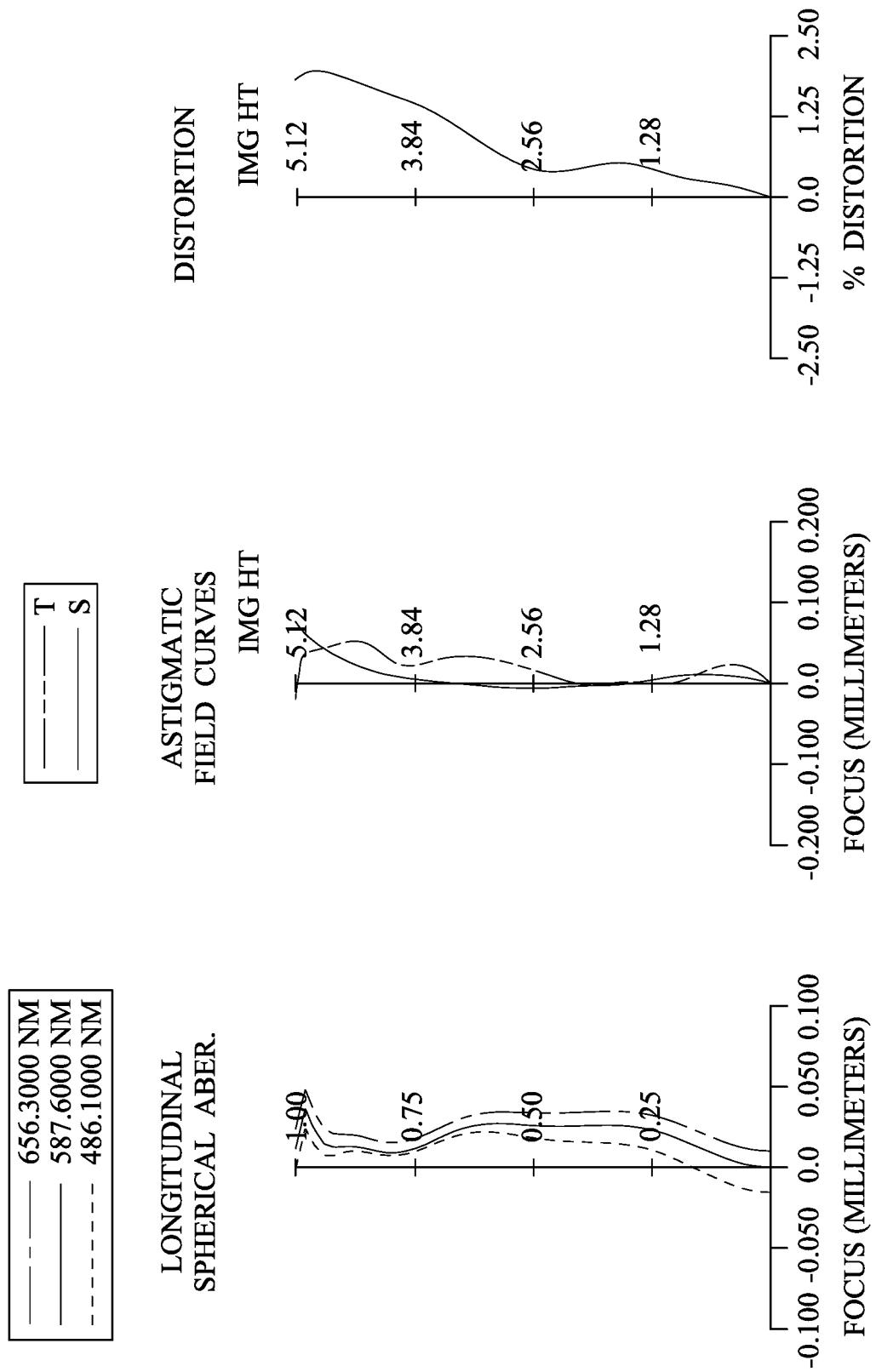
FIG. 2 shows spherical aberration curves, astigmatic field curves and a distortion curve of the imaging apparatus according to the 1st embodiment.

FIG. 1 is a schematic view of an imaging apparatus 1 according to the 1st embodiment of the present disclosure. FIG. 2 shows spherical aberration curves, astigmatic field curves and a distortion curve of the imaging apparatus 1 according to the 1st embodiment. In FIG. 1, the imaging apparatus 1 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

Figure 17:
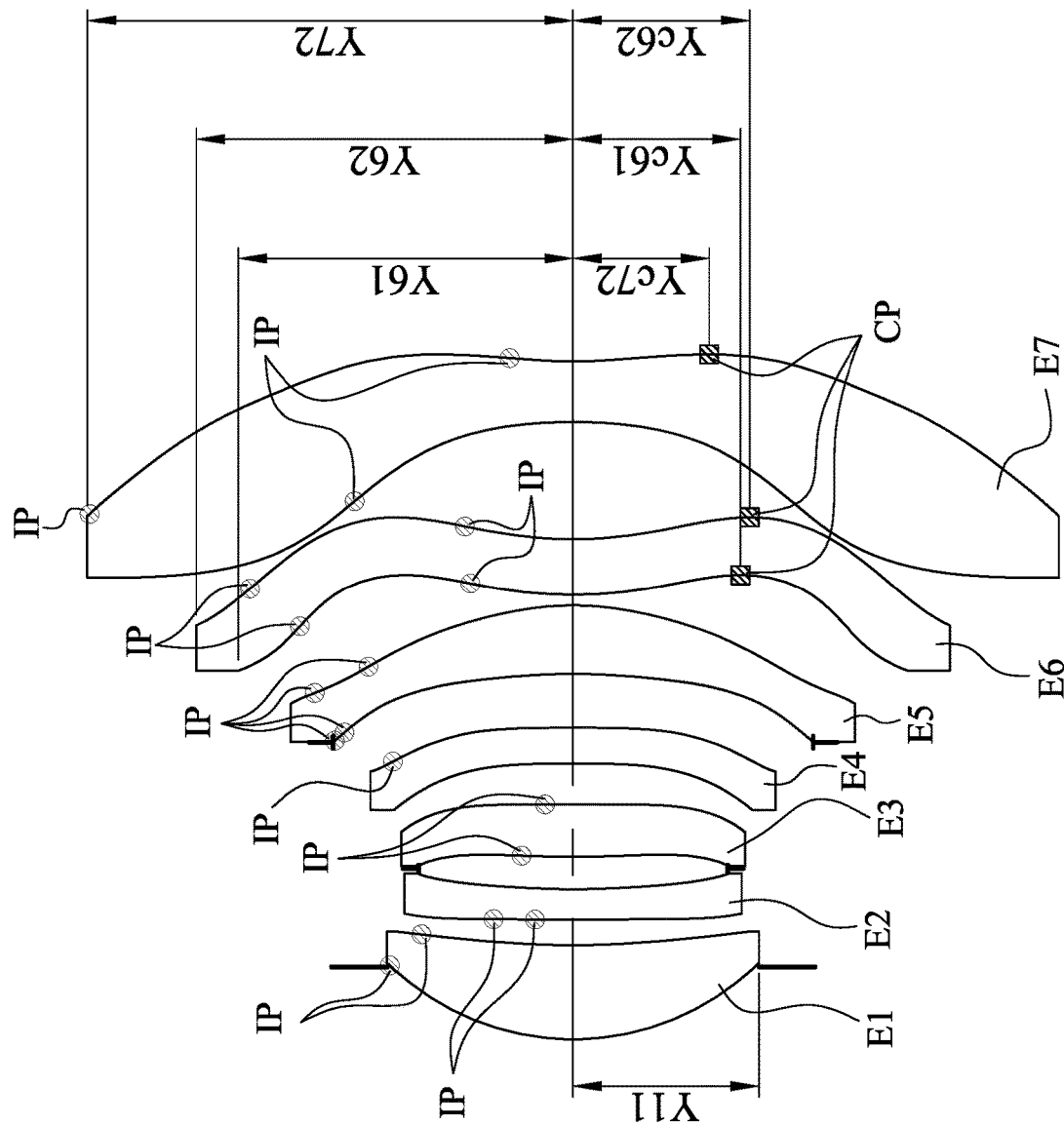
FIG. 17 is a schematic view of partial parameters, the inflection points of each lens element and the critical points of the sixth lens element and the image-side surface of the seventh lens element according to the 1st embodiment.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, FIG. 17 is a schematic view of partial parameters, the inflection points IP of each lens element and the critical points CP of the sixth lens element E6 and the image-side surface of the seventh lens element E7 according to the 1st embodiment. In FIG. 17, the object-side surface of the first lens element E1 includes one inflection point IP, and the image-side surface of the first lens element E1 includes one inflection point IP.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points IP (as shown in FIG. 17).

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point IP (as shown in FIG. 17), and the image-side surface of the third lens element E3 includes one inflection point IP (as shown in FIG. 17).

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point IP (as shown in FIG. 17).

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points IP (as shown in FIG. 17), and the image-side surface of the fifth lens element E5 includes two inflection points IP (as shown in FIG. 17).

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points IP (as shown in FIG. 17) and one critical point CP (as shown in FIG. 17) in an off-axis region thereof, and the image-side surface of the sixth lens element E6 includes two inflection points IP (as shown in FIG. 17) and one critical point CP (as shown in FIG. 17) in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point IP (as shown in FIG. 17), and the image-side surface of the seventh lens element E7 includes two inflection points IP (as shown in FIG. 17) and one critical point CP (as shown in FIG. 17) in an off-axis region thereof.

The filter E8 is made of a glass material, which is located between the seventh lens element E7 and the image surface IMG in order, and will not affect the focal length of the optical imaging system assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,
X is the displacement in parallel with an optical axis from the intersection point of the aspheric surface and the optical axis to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient.

In the optical imaging system assembly according to the 1st embodiment, when a focal length of the optical imaging system assembly is f, an f-number of the optical imaging system assembly is Fno, and half of a maximum field of view of the optical imaging system assembly is HFOV, these parameters have the following values: f=5.45 mm; Fno=1.75; and HFOV=42.6 degrees.

In the optical imaging system assembly according to the 1st embodiment, when an Abbe number of the fourth lens element E4 is V4, an Abbe number of the fifth lens element E5 is V5, and an Abbe number of the sixth lens element E6 is V6, the following condition is satisfied: (V5+V6)/V4=7.98.

In the optical imaging system assembly according to the 1st embodiment, when a central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, a central thickness of the sixth lens element E6 is CT6, an axial distance between the first lens element E1 and the second lens element E2 is T12, an axial distance between the second lens element E2 and the third lens element E3 is T23, and an axial distance between the sixth lens element E6 and the seventh lens element E7 is T67, the following conditions are satisfied: (CT1+CT2+CT3+CT4+CT5+CT6)/T67=2.87; T23/T12=1.31; and T67/T23=3.55.

In the optical imaging system assembly according to the 1st embodiment, when an axial distance between the object-side surface of the first lens element E1 and the image surface IMG is TL, an entrance pupil diameter of the optical imaging system assembly is EPD, the focal length of the optical imaging system assembly is f, and a maximum image height of the optical imaging system assembly is ImgH, the following conditions are satisfied: TL/EPD=2.10; TL/f=1.20; and TL/ImgH=1.28.

In the optical imaging system assembly according to the 1st embodiment, when the axial distance between the first lens element E1 and the second lens element E2 is T12, the axial distance between the second lens element E2 and the third lens element E3 is T23, an axial distance between the third lens element E3 and the fourth lens element E4 is T34, an axial distance between the fourth lens element E4 and the fifth lens element E5 is T45, an axial distance between the fifth lens element E5 and the sixth lens element E6 is T56, the axial distance between the sixth lens element E6 and the seventh lens element E7 is T67, a sum of all axial distances between adjacent lens elements of the optical imaging system assembly is ΣAT, the central thickness of the first lens element E1 is CT1, the central thickness of the second lens element E2 is CT2, the central thickness of the third lens element E3 is CT3, the central thickness of the fourth lens element E4 is CT4, the central thickness of the fifth lens element E5 is CT5, the central thickness of the sixth lens element E6 is CT6, a central thickness of the seventh lens element E7 is CT7, and a sum of central thicknesses of all lens elements of the optical imaging system assembly is ΣCT, the following conditions are satisfied: ΣAT/T23=8.52; and ΣCT/ΣAT=1.41. In according to the 1st embodiment, an axial distance between two adjacent lens elements indicates a distance along the optical axis between two adjacent lens surfaces of the adjacent lens elements; ΣCT=CT1+CT2+CT3+CT4+CT5+CT6+CT7; ΣAT=T12+T23+T34+T45+T56+T67.

In the optical imaging system assembly according to the 1st embodiment, when the focal length of the optical imaging system assembly is f, a focal length of the third lens element E3 is f3, and a focal length of the fourth lens element E4 is f4, the following condition is satisfied: |f/f3|+|f/f4|=0.37.

In the optical imaging system assembly according to the 1st embodiment, when a focal length of the first lens element E1 is f1, a curvature radius of the object-side surface of the first lens element E1 is R1, and a curvature radius of the image-side surface of the first lens element E1 is R2, the following condition is satisfied: f1/R1+f1/R2=3.21.

In the optical imaging system assembly according to the 1st embodiment, when the focal length of the optical imaging system assembly is f, the focal length of the first lens element E1 is f1, a focal length of the second lens element E2 is f2, a focal length of the fifth lens element E5 is f5, and a focal length of the sixth lens element E6 is f6, the following conditions are satisfied: f2/f=−2.62; f5/f=1.18; and f6/f1=−7.52.

In the optical imaging system assembly according to the 1st embodiment, when the focal length of the sixth lens element E6 is f6, a curvature radius of the object-side surface of the sixth lens element E6 is R11, and a curvature radius of the image-side surface of the sixth lens element E6 is R12, the following condition is satisfied: f6/R11+f6/R12=−21.42.

In the optical imaging system assembly according to the 1st embodiment, when a focal length of the seventh lens element E7 is f7, a curvature radius of the object-side surface of the seventh lens element E7 is R13, and a curvature radius of the image-side surface of the seventh lens element E7 is R14, the following condition is satisfied: f7/R13+f7/R14=−0.26.

In the optical imaging system assembly according to the 1st embodiment, when a maximum distance between an optical effective region of the object-side surface of the first lens element E1 and the optical axis is Y11 (as shown in FIG. 17), and a maximum distance between an optical effective region of the image-side surface of the seventh lens element E7 and the optical axis is Y72 (as shown in FIG. 17), the following condition is satisfied: Y72/Y11=2.61.

In the optical imaging system assembly according to the 1st embodiment, when a distance between the critical point CP of the object-side surface of the sixth lens element E6 and the optical axis is Yc61 (as shown in FIG. 17), a maximum distance between an optical effective region of the object-side surface of the sixth lens element E6 and the optical axis is Y61 (as shown in FIG. 17), a distance between the critical point CP of the image-side surface of the sixth lens element E6 and the optical axis is Yc62 (as shown in FIG. 17), a maximum distance between an optical effective region of the image-side surface of the sixth lens element E6 and the optical axis is Y62 (as shown in FIG. 17), a distance between the critical point CP of the image-side surface of the seventh lens element E7 and the optical axis is Yc72 (as shown in FIG. 17), and the maximum distance between the optical effective region of the image-side surface of the seventh lens element E7 and the optical axis is Y72 (as shown in FIG. 17), the following conditions are satisfied: Yc61/Y61=0.50; Yc62/Y62=0.47; and Yc72/Y72=0.28.

The detailed optical data of the 1st embodiment are shown in Table 1 and the aspheric surface data are shown in Table 2 below.

TABLE 1

1st Embodiment
f = 5.45 mm, Fno = 1.75, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.607 | | | | |
| 2 | Lens 1 | 2.2400 | ASP | 0.789 | Plastic | 1.545 | 56.1 | 5.55 |
| 3 | | 7.5709 | ASP | 0.211 | | | | |
| 4 | Lens 2 | 19.2149 | ASP | 0.257 | Plastic | 1.669 | 19.5 | −14.31 |

TABLE 1-continued

1st Embodiment
f = 5.45 mm, Fno = 1.75, HFOV = 42.6 deg.

| Surface # | | Curvature Radius | | Thickness | Material | Index | Abbe # | Focal Length |
|---|---|---|---|---|---|---|---|---|
| 5 | | 6.3548 | ASP | 0.175 | | | | |
| 6 | Stop | Plano | | 0.102 | | | | |
| 7 | Lens 3 | 7.8498 | ASP | 0.437 | Plastic | 1.529 | 58.0 | 20.82 |
| 8 | | 26.7844 | ASP | 0.345 | | | | |
| 9 | Lens 4 | −24.2703 | ASP | 0.298 | Plastic | 1.705 | 14.0 | −51.70 |
| 10 | | −73.0542 | ASP | −0.121 | | | | |
| 11 | Stop | Plano | | 0.574 | | | | |
| 12 | Lens 5 | −5.8298 | ASP | 0.576 | Plastic | 1.544 | 56.0 | 6.42 |
| 13 | | −2.2602 | ASP | 0.091 | | | | |
| 14 | Lens 6 | 4.3577 | ASP | 0.464 | Plastic | 1.544 | 56.0 | −41.70 |
| 15 | | 3.5184 | ASP | 0.983 | | | | |
| 16 | Lens 7 | −5.3839 | ASP | 0.508 | Plastic | 1.534 | 56.0 | −4.25 |
| 17 | | 4.0546 | ASP | 0.400 | | | | |
| 18 | Filter | Plano | | 0.210 | Glass | 1.517 | 64.2 | — |
| 19 | | Plano | | 0.257 | | | | |
| 20 | Image | Plano | | — | | | | |

Reference wavelength is 587.6 nm (d-line).
Effective radius of Surface 11 (stop S2) is 2.010 mm.
Effective radius of Surface 6 (stop S1) is 1.295 mm.

TABLE 2

Aspheric Coefficients

| Surface # | 2 | 3 | 4 | 5 | 7 |
|---|---|---|---|---|---|
| k = | 1.51234E−01 | 5.39116E+00 | 9.46570E+01 | 2.33650E+00 | −9.79790E+01 |
| A4 = | 1.813132581E−03 | −2.148708074E−02 | −6.664150149E−02 | −5.786736983E−02 | −3.419604815E−02 |
| A6 = | 8.994233758E−03 | 2.507983143E−02 | 1.113426633E−01 | 5.796637335E−02 | −1.446834948E−02 |
| A8 = | 1.440757646E−02 | −3.076454122E−02 | −1.392435127E−01 | −1.393308247E−03 | 2.930053765E−02 |
| A10 = | −1.101593708E−02 | 2.950621343E−02 | 1.324031170E−01 | −4.848742259E−02 | −4.852870648E−02 |
| A12 = | 4.159514832E−03 | −1.794096183E−02 | −7.898779983E−02 | 5.137652854E−02 | 3.896888312E−02 |
| A14 = | −6.367670992E−04 | 5.879030722E−03 | 2.577807892E−02 | −2.335849122E−02 | −1.691906215E−02 |
| A16 = | | −7.994511254E−04 | −3.457921862E−03 | 4.216718620E−03 | 3.113205869E−03 |

| Surface # | 8 | 9 | 10 | 12 | 13 |
|---|---|---|---|---|---|
| k = | −2.77158E+01 | −7.30478E+01 | −9.90000E+01 | −2.64987E+01 | −1.14081E+01 |
| A4 = | −5.934804483E−02 | −1.185412078E−01 | −1.001268779E−01 | −2.259252879E−02 | −2.305821040E−02 |
| A6 = | 3.766640427E−02 | 1.447526399E−01 | 1.092757344E−01 | 6.690192139E−02 | 1.951607549E−02 |
| A8 = | −8.306502844E−02 | −3.288906870E−01 | −1.866264108E−01 | −9.683552686E−02 | −3.357123402E−02 |
| A10 = | 9.289483038E−02 | 4.886567118E−01 | 2.063944806E−01 | 7.084868958E−02 | 2.770331274E−02 |
| A12 = | −6.038983453E−02 | −4.710292662E−01 | −1.455017078E−01 | −3.268266696E−02 | −1.322290693E−02 |
| A14 = | 2.064033451E−02 | 2.967408505E−01 | 6.696553915E−02 | 1.005271795E−02 | 3.925453409E−03 |
| A16 = | 2.855804115E−03 | −1.175364703E−01 | −1.952754139E−02 | −2.034662781E−03 | −7.253794408E−04 |
| A18 = | | 2.646796525E−02 | 3.262073195E−03 | 2.451968916E−04 | 8.061656964E−05 |
| A20 = | | −2.577887853E−03 | −2.355275849E−04 | 1.314388249E−05 | −4.923967885E−06 |
| A22 = | | | | | 1.270964921E−07 |

| Surface # | 14 | 15 | 16 | 17 |
|---|---|---|---|---|
| k = | 3.63833E−02 | 0.00000E+00 | −6.28725E−01 | −1.33911E+01 |
| A4 = | 5.365205516E−02 | −1.906491791E−02 | −9.577673069E−02 | −8.708745861E−02 |
| A6 = | −6.362013350E−02 | 3.459958003E−02 | 7.956173440E−02 | 6.149532837E−02 |
| A8 = | 4.965402346E−03 | −6.868666128E−02 | −5.111625827E−02 | −3.270192003E−02 |
| A10 = | 1.788536633E−02 | 5.329017357E−02 | 1.920911584E−02 | 1.113191718E−02 |
| A12 = | −1.353778598E−02 | −2.469140853E−02 | −4.243188318E−03 | −2.490268709E−03 |
| A14 = | 5.479164224E−03 | 7.569655950E−03 | 5.535868468E−04 | 3.779349537E−04 |
| A16 = | −1.441221699E−03 | −1.564689379E−03 | −3.511931061E−05 | −3.891842959E−05 |
| A18 = | 2.530284320E−04 | 2.102294300E−04 | −1.044456289E−06 | 2.571275550E−06 |
| A20 = | −2.903808586E−05 | −1.567694210E−05 | 4.475795821E−07 | −8.443813318E−08 |
| A22 = | 2.067496558E−06 | 8.450783764E−08 | −4.580151364E−08 | −1.590627296E−09 |
| A24 = | −8.195924088E−08 | 1.066884542E−07 | 2.649289769E−09 | 3.130825234E−10 |
| A26 = | 1.364199949E−09 | −1.056739063E−08 | −9.313820278E−11 | −1.495012421E−11 |
| A28 = | | 4.572087049E−10 | 1.865291504E−12 | 3.442623583E−13 |
| A30 = | | −7.859970669E−12 | −1.641589809E−14 | −3.256765781E−15 |

In Table 1, the curvature radius, the thickness and the focal length are shown in millimeters (mm). Surface numbers 0-20 represent the surfaces sequentially arranged from the object side to the image side along the optical axis. In Table 2, k represents the conic coefficient of the equation of the aspheric surface profiles. A4-A30 represent the aspheric coefficients ranging from the 4th order to the 30th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
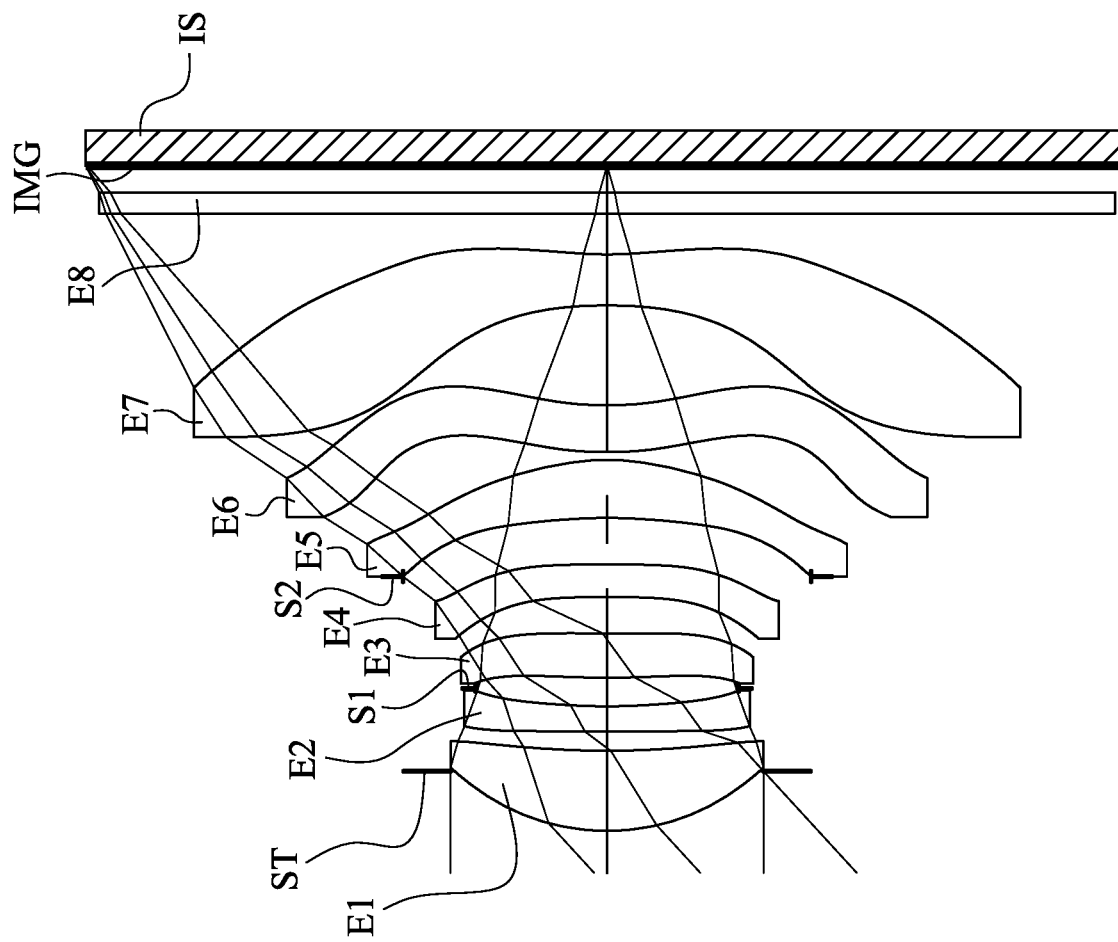
FIG. 3 is a schematic view of an imaging apparatus according to the 2nd embodiment of the present disclosure.
Figure 4:
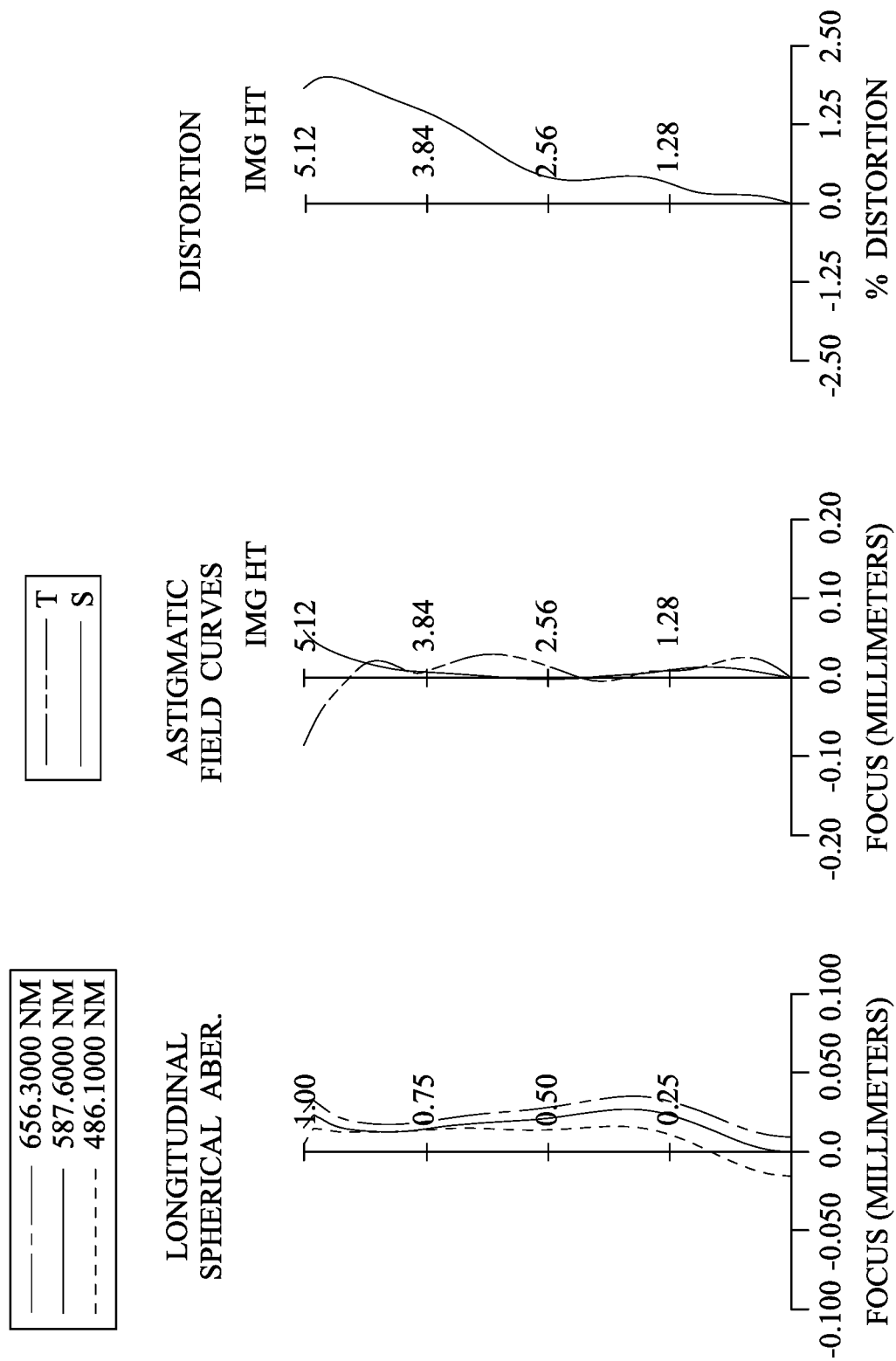
FIG. 4 shows spherical aberration curves, astigmatic field curves and a distortion curve of the imaging apparatus according to the 2nd embodiment.

FIG. 3 is a schematic view of an imaging apparatus 2 according to the 2nd embodiment of the present disclosure. FIG. 4 shows spherical aberration curves, astigmatic field curves and a distortion curve of the imaging apparatus 2 according to the 2nd embodiment. In FIG. 3, the imaging apparatus 2 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes two inflection points and one critical point in an off-axis region thereof.

The filter E8 is made of a glass material, which is located between the seventh lens element E7 and the image surface IMG in order, and will not affect the focal length of the optical imaging system assembly.

The detailed optical data of the 2nd embodiment are shown in Table 3 and the aspheric surface data are shown in Table 4 below.

TABLE 3

2nd Embodiment
f = 5.47 mm, Fno = 1.78, HFOV = 42.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.586 | | | | |
| 2 | Lens 1 | 2.2133 | ASP | 0.787 | Plastic | 1.545 | 56.1 | 5.39 |
| 3 | | 7.8467 | ASP | 0.188 | | | | |
| 4 | Lens 2 | 17.5862 | ASP | 0.250 | Plastic | 1.669 | 19.5 | −12.95 |
| 5 | | 5.7700 | ASP | 0.177 | | | | |

TABLE 3-continued

2nd Embodiment
f = 5.47 mm, Fno = 1.78, HFOV = 42.5 deg.

| Surface # | | Curvature Radius | | Thickness | Material | Index | Abbe # | Focal Length |
|---|---|---|---|---|---|---|---|---|
| 6 | Stop | Plano | | 0.104 | | | | |
| 7 | Lens 3 | 8.0215 | ASP | 0.437 | Plastic | 1.544 | 56.0 | 18.43 |
| 8 | | 39.3359 | ASP | 0.357 | | | | |
| 9 | Lens 4 | −20.2711 | ASP | 0.320 | Plastic | 1.669 | 19.5 | −39.27 |
| 10 | | −89.3315 | ASP | −0.118 | | | | |
| 11 | Stop | Plano | | 0.575 | | | | |
| 12 | Lens 5 | −5.9072 | ASP | 0.571 | Plastic | 1.544 | 56.0 | 6.37 |
| 13 | | −2.2589 | ASP | 0.079 | | | | |
| 14 | Lens 6 | 4.3659 | ASP | 0.460 | Plastic | 1.544 | 56.0 | −41.69 |
| 15 | | 3.5252 | ASP | 0.980 | | | | |
| 16 | Lens 7 | −5.3846 | ASP | 0.502 | Plastic | 1.534 | 56.0 | −4.18 |
| 17 | | 3.9474 | ASP | 0.400 | | | | |
| 18 | Filter | Plano | | 0.210 | Glass | 1.517 | 64.2 | — |
| 19 | | Plano | | 0.262 | | | | |
| 20 | Image | Plano | | — | | | | |

Reference wavelength is 587.6 nm (d-line).
Effective radius of Surface 6 (stop S1) is 1.290 mm.
Effective radius of Surface 11 (stop S2) is 2.005 mm.

TABLE 4

Aspheric Coefficients

| Surface # | 2 | 3 | 4 | 5 | 7 |
|---|---|---|---|---|---|
| k = | 1.37277E−01 | 3.84522E+00 | 9.47611E+01 | 4.84260E+00 | −8.51358E+01 |
| A4 = | 1.234039231E−03 | −2.104610909E−02 | −6.449983813E−02 | −5.765899626E−02 | −2.974078130E−02 |
| A6 = | −6.473681636E−03 | 1.225595392E−02 | 8.270002855E−02 | 5.905345825E−02 | −1.362555596E−02 |
| A8 = | 1.133378204E−02 | −9.744999622E−04 | −6.932986824E−02 | −6.483535895E−03 | 3.192930098E−02 |
| A10 = | −9.392319142E−03 | −5.018294273E−03 | 4.859072648E−02 | 3.573185198E−02 | −5.317743834E−02 |
| A12 = | 3.792176082E−03 | 3.411101276E−03 | −2.496231013E−02 | 3.805196895E−02 | 4.196571368E−02 |
| A14 = | −6.292653925E−04 | −8.618007675E−04 | 7.954255974E−03 | −1.663773518E−02 | −1.730590098E−02 |
| A16 = | | 5.173995784E−05 | −1.103116777E−03 | 2.920864138E−03 | 2.967438525E−03 |

| Surface # | 8 | 9 | 10 | 12 | 13 |
|---|---|---|---|---|---|
| k = | −5.96950E+01 | −9.87094E+01 | −7.79427E+01 | −2.85756E+01 | −1.14537E+01 |
| A4 = | −5.298118802E−02 | −1.268998994E−01 | −1.022960477E−01 | −2.233483451E−02 | −2.020965430E−02 |
| A6 = | 2.816875086E−02 | 1.817910613E−01 | 1.180264481E−01 | 6.323987718E−02 | 9.810200971E−03 |
| A8 = | −6.340680986E−02 | −4.483114824E−01 | −2.138441477E−01 | −8.957530424E−02 | −1.704253641E−02 |
| A10 = | 6.934414237E−02 | 6.972182385E−01 | 2.473172120E−01 | 6.400533623E−02 | 1.341538682E−02 |
| A12 = | −4.562934021E−02 | −6.944912399E−01 | −1.832514633E−01 | −2.951105493E−02 | −6.135699491E−03 |
| A14 = | 1.601300135E−02 | 4.450118379E−01 | 8.841619582E−02 | 9.325533749E−03 | 1.780772985E−03 |
| A16 = | −2.302212165E−03 | −1.767161106E−01 | −2.672469897E−02 | −1.966344375E−03 | −3.239968263E−04 |
| A18 = | | 3.951692537E−02 | 4.570737141E−03 | 2.460003920E−04 | 3.550480553E−05 |
| A20 = | | −3.803056806E−03 | −3.352032374E−04 | −1.352269411E−05 | −2.156976556E−06 |
| A22 = | | | | | 5.686351548E−08 |

| Surface # | 14 | 15 | 16 | 17 |
|---|---|---|---|---|
| k = | 3.83500E−02 | 0.00000E+00 | −6.55802E−01 | −1.35363E+01 |
| A4 = | 5.535194778E−02 | −1.924069437E−02 | −9.582262737E−02 | −9.255466405E−02 |
| A6 = | −6.763730331E−02 | 3.996869597E−02 | 8.015756496E−02 | 6.794095349E−02 |
| A8 = | 7.248025572E−03 | −8.169489867E−02 | −5.188593378E−02 | −3.718680875E−02 |
| A10 = | 1.894008138E−02 | 6.783086603E−02 | 1.973652859E−02 | 1.318690718E−02 |
| A12 = | −1.556355052E−02 | −3.431531778E−02 | −4.474447451E−03 | −3.133036681E−03 |
| A14 = | 6.664916754E−03 | 1.174788752E−02 | 6.224341879E−04 | 5.185105885E−04 |
| A16 = | −1.828218699E−03 | −2.818313321E−03 | −4.944831494E−05 | −6.081342836E−05 |
| A18 = | 3.316511074E−04 | 4.771274269E−04 | 1.073442901E−06 | 5.026520357E−06 |
| A20 = | −3.921005335E−05 | −5.636555272E−05 | 2.242770334E−07 | −2.830263022E−07 |
| A22 = | 2.883714652E−06 | 4.499328994E−06 | −2.913712488E−08 | 9.886225175E−09 |
| A24 = | −1.190248757E−07 | −2.262595837E−07 | 1.789998085E−09 | −1.490512286E−10 |
| A26 = | 2.092679154E−09 | 6.020300876E−09 | −6.403194837E−11 | −2.634264319E−12 |
| A28 = | | −3.355230433E−11 | 1.282792866E−12 | 1.490059983E−13 |
| A30 = | | −1.332092763E−12 | −1.119798679E−14 | −1.862237359E−15 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.47 | \|f/f3\| + \|f/f4\| | 0.44 |
| Fno | 1.78 | f1/R1 + f1/R2 | 3.12 |
| HFOV [degrees] | 42.5 | f2/f | −2.37 |
| (V5 + V6)/V4 | 5.76 | f5/f | 1.16 |
| (CT1 + CT2 + CT3 + CT4 + CT5 + CT6)/T67 | 2.88 | f6/f1 | −7.73 |
| T23/T12 | 1.49 | f6/R11 + f6/R12 | −21.37 |
| T67/T23 | 3.49 | f7/R13 + f7/R14 | −0.28 |
| TL/EPD | 2.13 | Y72/Y11 | 2.64 |
| TL/f | 1.20 | Yc61/Y61 | 0.50 |
| TL/ImgH | 1.28 | Yc62/Y62 | 0.47 |
| ΣAT/T23 | 8.33 | Yc72/Y72 | 0.28 |
| ΣCT/ΣAT | 1.42 | | |

3rd Embodiment

Figure 5:
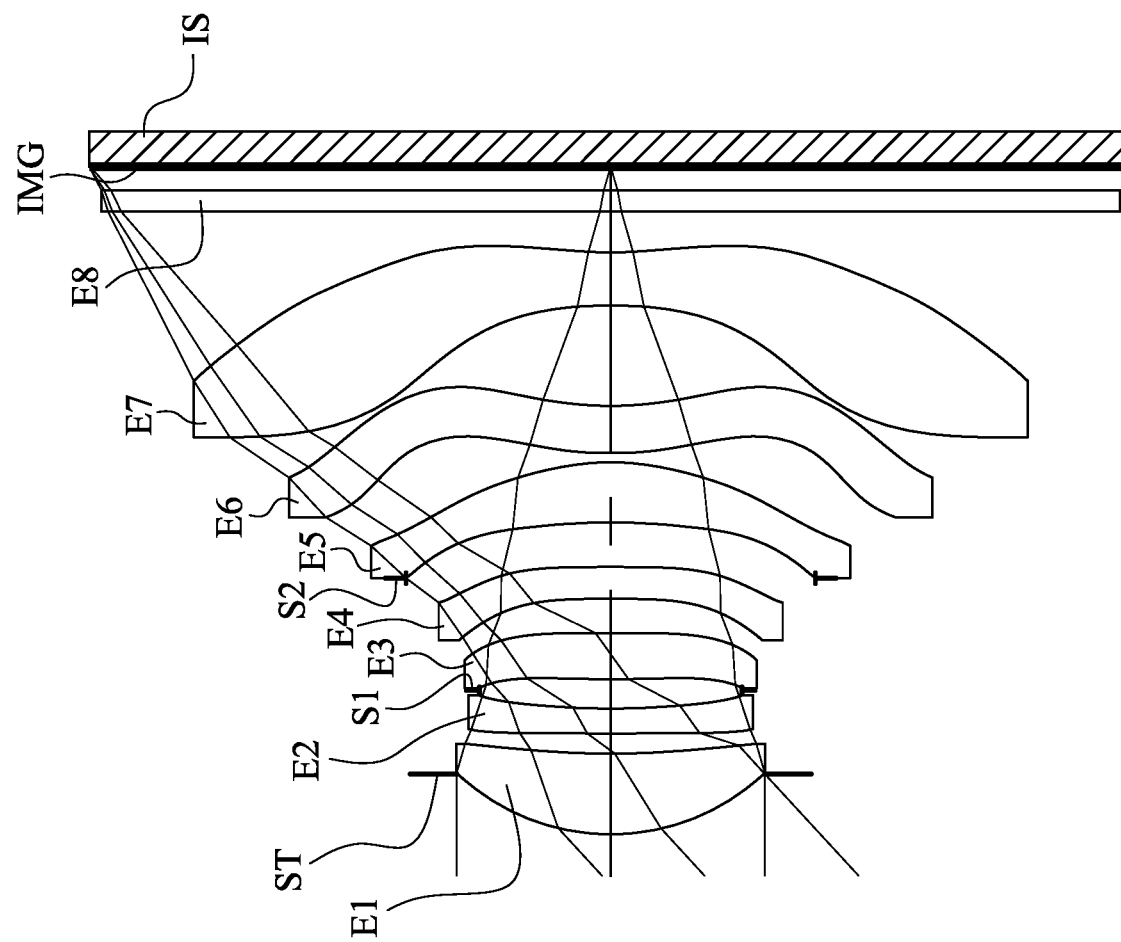
FIG. 5 is a schematic view of an imaging apparatus according to the 3rd embodiment of the present disclosure.
Figure 6:
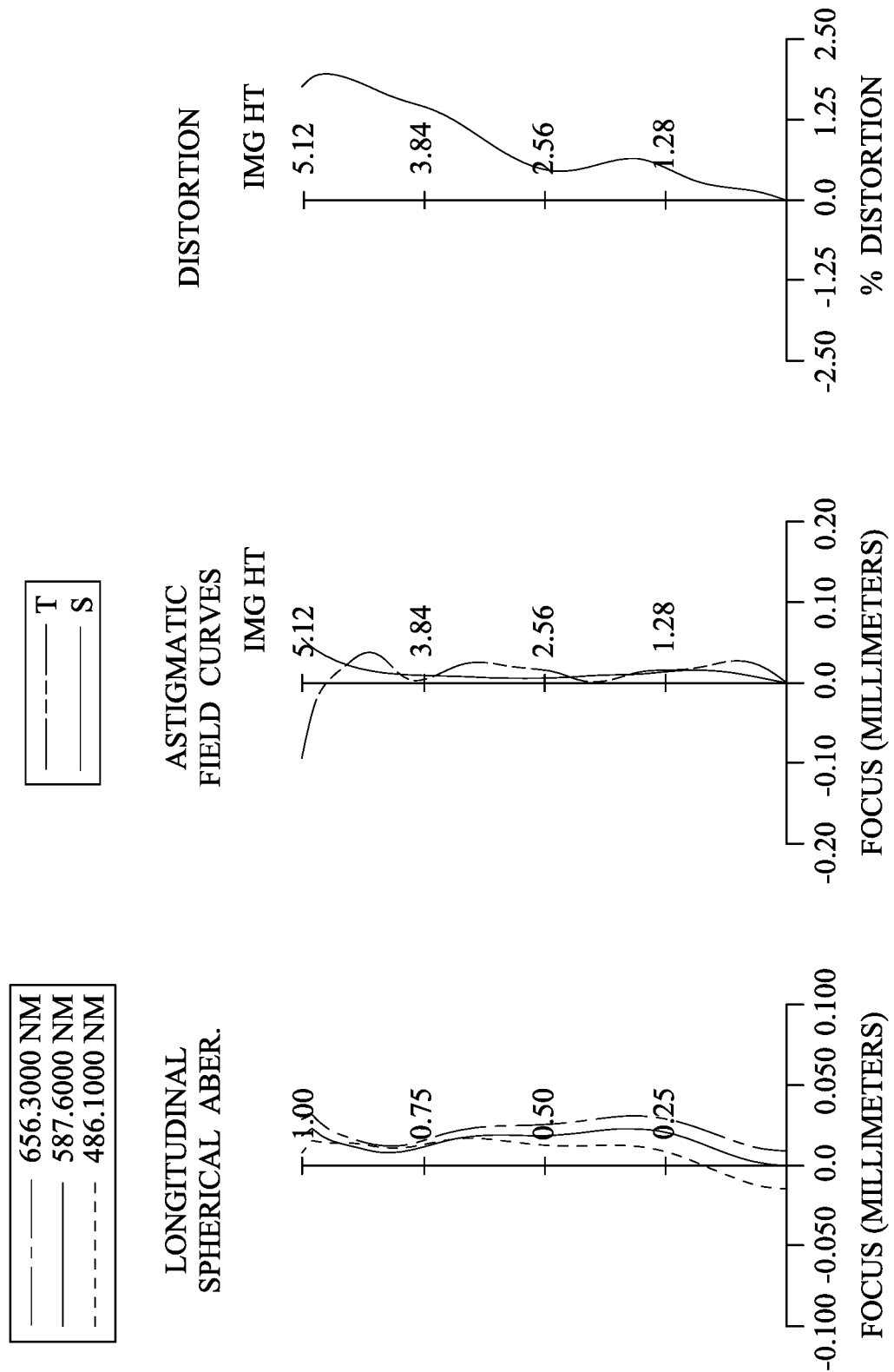
FIG. 6 shows spherical aberration curves, astigmatic field curves and a distortion curve of the imaging apparatus according to the 3rd embodiment.

FIG. 5 is a schematic view of an imaging apparatus 3 according to the 3rd embodiment of the present disclosure. FIG. 6 shows spherical aberration curves, astigmatic field curves and a distortion curve of the imaging apparatus 3 according to the 3rd embodiment. In FIG. 5, the imaging apparatus 3 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a glass material, and has the object-side surface and the image-side surface being both aspheric. Furthermore, the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point.

The fourth lens element E4 with negative refractive power has an object-side surface being concave in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes two inflection points and one critical point in an off-axis region thereof.

The filter E8 is made of a glass material, which is located between the seventh lens element E7 and the image surface IMG in order, and will not affect the focal length of the optical imaging system assembly.

The detailed optical data of the 3rd embodiment are shown in Table 5 and the aspheric surface data are shown in Table 6 below.

TABLE 5

3rd Embodiment
f = 5.45 mm, Fno = 1.80, HFOV = 42.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.593 | | | | |
| 2 | Lens 1 | 2.2295 | ASP | 0.792 | Glass | 1.542 | 62.9 | 5.46 |
| 3 | | 7.8733 | ASP | 0.198 | | | | |
| 4 | Lens 2 | 19.2189 | ASP | 0.245 | Plastic | 1.650 | 21.8 | −14.97 |
| 5 | | 6.4242 | ASP | 0.180 | | | | |
| 6 | Stop | Plano | | 0.109 | | | | |
| 7 | Lens 3 | 11.4330 | ASP | 0.454 | Plastic | 1.544 | 56.0 | 19.86 |
| 8 | | −193.2996 | ASP | 0.337 | | | | |
| 9 | Lens 4 | −23.4735 | ASP | 0.312 | Plastic | 1.680 | 18.2 | −30.82 |
| 10 | | 196.4399 | ASP | −0.109 | | | | |
| 11 | Stop | Plano | | 0.549 | | | | |
| 12 | Lens 5 | −6.1711 | ASP | 0.590 | Plastic | 1.544 | 56.0 | 6.21 |
| 13 | | −2.2575 | ASP | 0.091 | | | | |
| 14 | Lens 6 | 4.3792 | ASP | 0.463 | Plastic | 1.544 | 56.0 | −40.85 |
| 15 | | 3.5221 | ASP | 0.986 | | | | |
| 16 | Lens 7 | −5.3863 | ASP | 0.522 | Plastic | 1.534 | 56.0 | −4.13 |
| 17 | | 3.8573 | ASP | 0.400 | | | | |
| 18 | Filter | Plano | | 0.210 | Glass | 1.517 | 64.2 | — |
| 19 | | Plano | | 0.232 | | | | |
| 20 | Image | Plano | | — | | | | |

Reference wavelength is 587.6 nm (d-line).
Effective radius of Surface 6 (stop S1) is 1.290 mm.
Effective radius of Surface 11 (stop S2) is 2.010 mm.

TABLE 6

Aspheric Coefficients

| Surface # | 2 | 3 | 4 | 5 | 7 |
|---|---|---|---|---|---|
| k = | 1.52001E−01 | 5.18426E+00 | 9.53723E+01 | 3.91520E+00 | −9.83524E+01 |
| A4 = | 4.142552555E−04 | −1.727853311E−02 | −5.612683107E−02 | −4.959720118E−02 | −3.639368770E−02 |
| A6 = | −2.846351912E−03 | 1.239138449E−02 | 7.322828872E−02 | 5.115420865E−02 | −5.255879631E−03 |
| A8 = | 5.418201715E−03 | −1.361141019E−02 | −8.276250186E−02 | −2.027697469E−02 | 9.351394139E−03 |
| A10 = | −4.636974552E−03 | 1.500801381E−02 | 8.289913265E−02 | −5.263064036E−03 | −2.323635032E−02 |
| A12 = | 1.952270821E−03 | 1.116422490E−02 | −5.419610391E−02 | 1.407657858E−02 | 2.134434584E−02 |
| A14 = | −3.441169233E−04 | 4.368932190E−03 | 1.950634201E−02 | −8.134809443E−03 | −1.062006176E−02 |
| A16 = | | −6.842036183E−04 | −2.857313624E−03 | 1.807122344E−03 | 2.170703896E−03 |

| Surface # | 8 | 9 | 10 | 12 | 13 |
|---|---|---|---|---|---|
| k = | 3.31222E+01 | −3.88767E+01 | 3.50957E+01 | −3.50738E+01 | −1.14611E+01 |
| A4 = | −5.040917899E−02 | −1.250714283E−01 | −1.044367756E−01 | −2.445598513E−02 | −2.034811593E−02 |
| A6 = | 1.890646421E−02 | 1.592707761E−01 | 1.215445112E−01 | 7.508762566E−02 | 1.054821726E−02 |
| A8 = | −4.845910981E−02 | −3.815692612E−01 | −2.222401600E−01 | −1.104234089E−01 | −1.812820920E−02 |
| A10 = | 5.393085274E−02 | 5.790680780E−01 | 2.573773798E−01 | 8.297686932E−02 | 1.409118969E−02 |
| A12 = | −3.566917346E−02 | −5.621821481E−01 | −1.889845059E−01 | −3.962362169E−02 | −6.290210186E−03 |
| A14 = | 1.240638485E−02 | 3.531304490E−01 | 8.983049947E−02 | 1.260771992E−02 | 1.755979108E−03 |
| A16 = | −1.755384831E−03 | −1.385443042E−01 | 2.673684931E−02 | 2.606283218E−03 | −3.022732933E−04 |
| A18 = | | 3.081149765E−02 | 4.512263573E−03 | 3.152248452E−04 | 3.056856207E−05 |
| A20 = | | −2.962303025E−03 | −3.273522057E−04 | −1.672989055E−05 | −1.644355018E−06 |
| A22 = | | | | | 3.596519284E−08 |

| Surface # | 14 | 15 | 16 | 17 |
|---|---|---|---|---|
| k = | 6.83454E−02 | 0.00000E+00 | −6.57203E−01 | −1.31102E+01 |
| A4 = | 5.599956590E−02 | −1.910945473E−02 | −9.609978827E−02 | −8.921949450E−02 |
| A6 = | −7.124923058E−02 | 3.576885805E−02 | 8.026121377E−02 | 6.656247814E−02 |
| A8 = | 1.371758475E−02 | −7.326159667E−02 | −5.190802053E−02 | −3.629336564E−02 |
| A10 = | 1.326768368E−02 | 5.971564240E−02 | 1.975139741E−02 | 1.261354966E−02 |
| A12 = | −1.258344001E−02 | −2.949491754E−02 | −4.482670809E−03 | −2.906824348E−03 |
| A14 = | 5.643507838E−03 | 9.805320458E−03 | 6.250729589E−04 | 4.624042758E−04 |
| A16 = | −1.591004723E−03 | −2.263956048E−03 | −4.999183494E−05 | −5.156309339E−05 |

TABLE 6-continued

| Aspheric Coefficients | | | |
|---|---|---|---|
| A18 = | 2.940368291E−04 | 3.631054596E−04 | 1.149528930E−06 | 3.981130527E−06 |
| A20 = | −3.521374600E−05 | −3.942538327E−05 | 2.168729902E−07 | −2.013851108E−07 |
| A22 = | 2.613348362E−06 | 2.701006845E−06 | −2.863559183E−08 | 5.536104092E−09 |
| A24 = | −1.085864253E−07 | −9.344236985E−08 | 1.766777685E−09 | 3.027059937E−12 |
| A26 = | 1.919578755E−09 | −4.550623486E−10 | −6.333016393E−11 | −5.838175726E−12 |
| A28 = | | 1.536226353E−10 | 1.270285576E−12 | 1.823619872E−13 |
| A30 = | | −3.759748901E−12 | −1.109793248E−14 | −1.945481571E−15 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 5.45 | $|f/f3| + |f/f4|$ | 0.45 |
| Fno | 1.80 | f1/R1 + f1/R2 | 3.14 |
| HFOV [degrees] | 42.7 | f2/f | −2.75 |
| (V5 + V6)/V4 | 6.16 | f5/f | 1.14 |
| (CT1 + CT2 + CT3 + CT4 + CT5 + CT6)/T67 | 2.90 | f6/f1 | −7.48 |
| T23/T12 | 1.46 | f6/R11 + f6/R12 | −20.93 |
| T67/T23 | 3.41 | f7/R13 + f7/R14 | −0.30 |
| TL/EPD | 2.17 | Y72/Y11 | 2.70 |
| TL/f | 1.20 | Yc61/Y61 | 0.50 |
| TL/ImgH | 1.28 | Yc62/Y62 | 0.47 |
| ΣAT/T23 | 8.10 | Yc72/Y72 | 0.29 |
| ΣCT/ΣAT | 1.44 | | |

4th Embodiment

Figure 7:
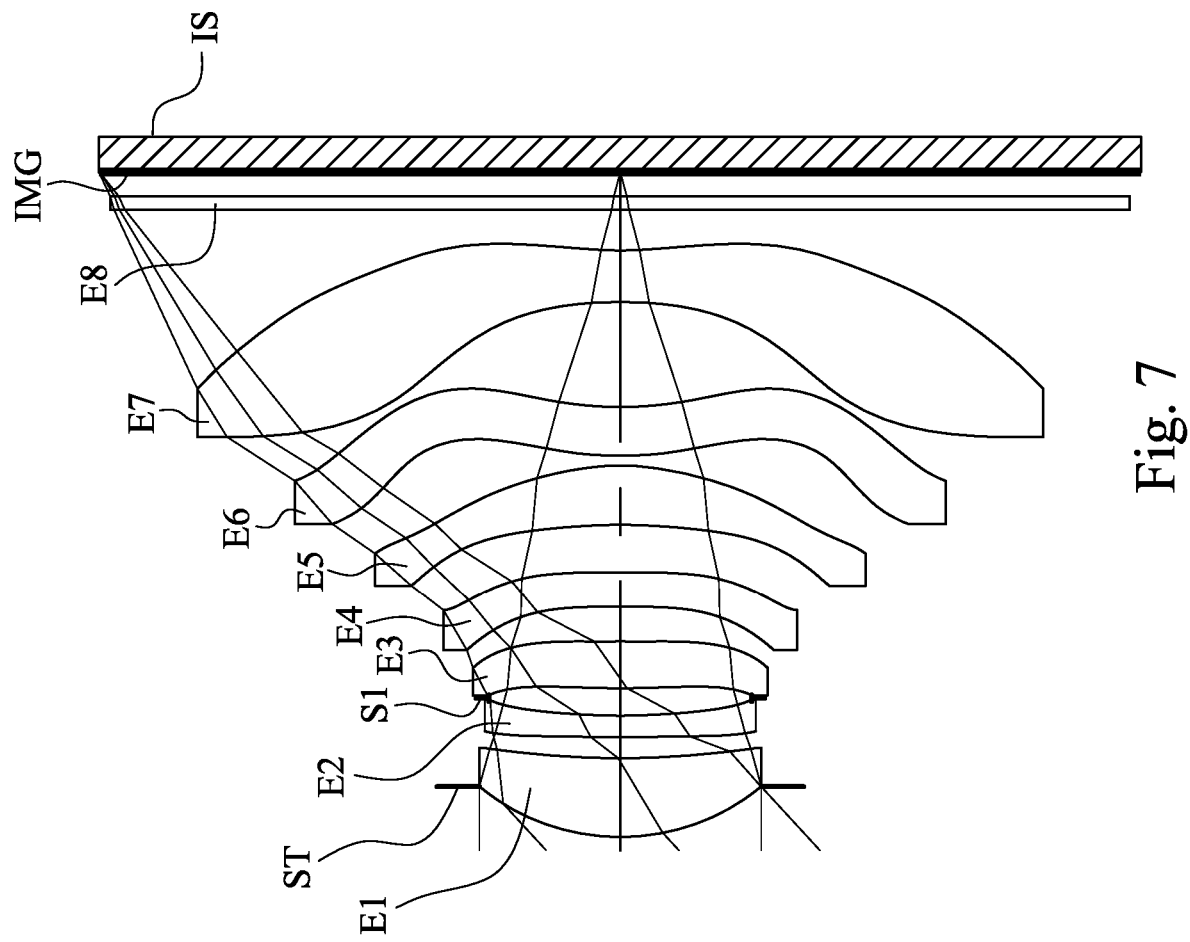
FIG. 7 is a schematic view of an imaging apparatus according to the 4th embodiment of the present disclosure.
Figure 8:
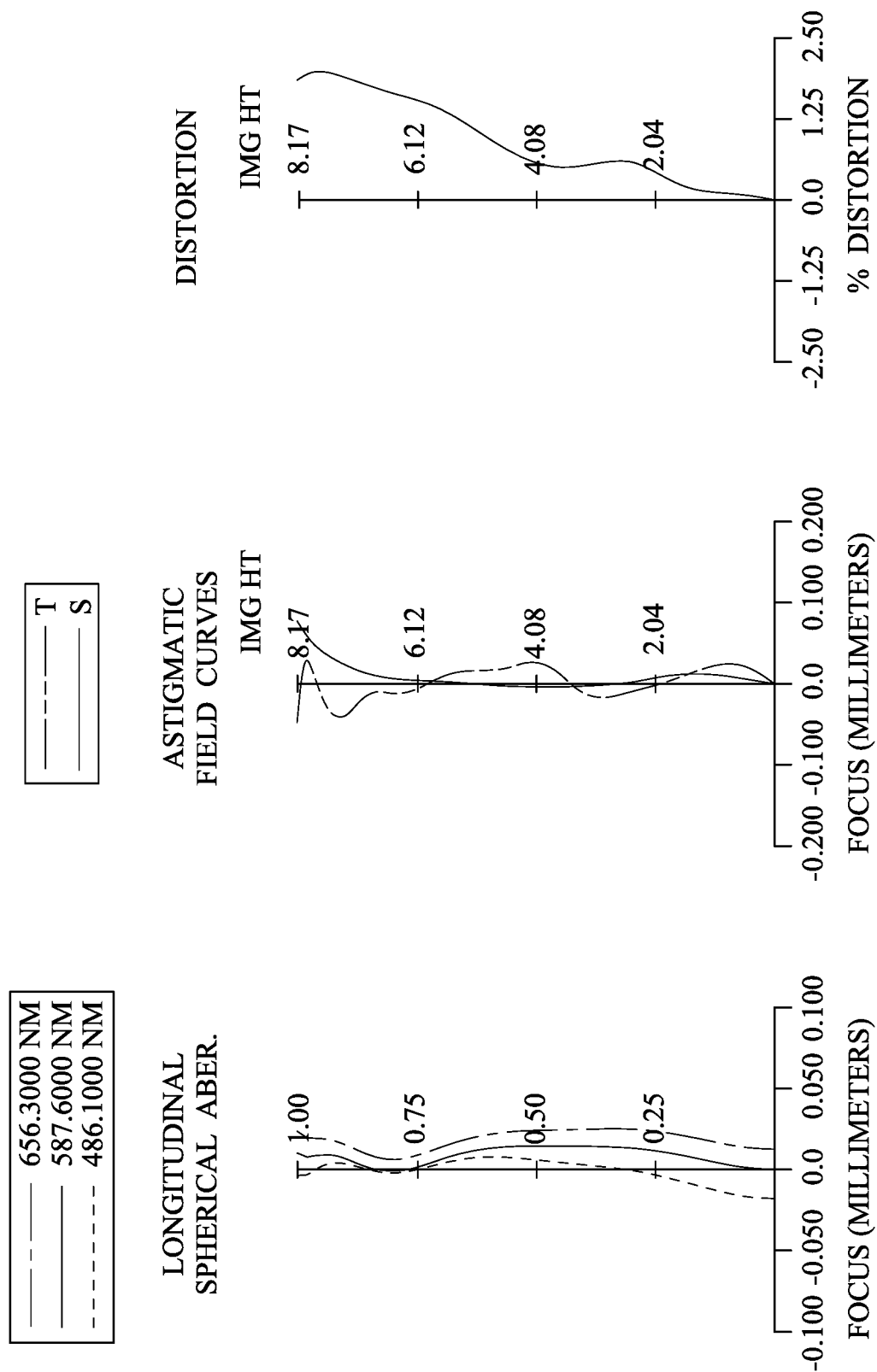
FIG. 8 shows spherical aberration curves, astigmatic field curves and a distortion curve of the imaging apparatus according to the 4th embodiment.

FIG. 7 is a schematic view of an imaging apparatus 4 according to the 4th embodiment of the present disclosure. FIG. 8 shows spherical aberration curves, astigmatic field curves and a distortion curve of the imaging apparatus 4 according to the 4th embodiment. In FIG. 7, the imaging apparatus 4 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes two inflection points and one critical point in an off-axis region thereof.

The filter E8 is made of a glass material, which is located between the seventh lens element E7 and the image surface IMG in order, and will not affect the focal length of the optical imaging system assembly.

The detailed optical data of the 4th embodiment are shown in Table 7 and the aspheric surface data are shown in Table 8 below.

TABLE 7

4th Embodiment
f = 8.71 mm, Fno = 1.97, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.789 | | | | |
| 2 | Lens 1 | 3.5395 | ASP | 1.236 | Plastic | 1.545 | 56.1 | 8.68 |
| 3 | | 12.3232 | ASP | 0.331 | | | | |
| 4 | Lens 2 | 24.7041 | ASP | 0.337 | Plastic | 1.686 | 18.4 | −21.27 |
| 5 | | 9.1224 | ASP | 0.275 | | | | |
| 6 | Stop | Plano | | 0.157 | | | | |
| 7 | Lens 3 | 14.5731 | ASP | 0.735 | Plastic | 1.544 | 56.0 | 30.66 |
| 8 | | 113.3487 | ASP | 0.549 | | | | |
| 9 | Lens 4 | −30.6910 | ASP | 0.545 | Plastic | 1.686 | 18.4 | −59.11 |
| 10 | | −127.1304 | ASP | 0.746 | | | | |
| 11 | Lens 5 | −9.5372 | ASP | 0.932 | Plastic | 1.544 | 56.0 | 10.14 |
| 12 | | −3.6153 | ASP | 0.158 | | | | |
| 13 | Lens 6 | 7.0002 | ASP | 0.761 | Plastic | 1.544 | 56.0 | −66.88 |
| 14 | | 5.6458 | ASP | 1.647 | | | | |
| 15 | Lens 7 | −8.5267 | ASP | 0.813 | Plastic | 1.534 | 56.0 | −6.57 |
| 16 | | 6.1723 | ASP | 0.640 | | | | |
| 17 | Filter | Plano | | 0.210 | Glass | 1.517 | 64.2 | — |
| 18 | | Plano | | 0.381 | | | | |
| 19 | Image | Plano | | — | | | | |

Reference wavelength is 587.6 nm (d-line).
Effective radius of Surface 6 (stop S1) is 2.06 mm.

TABLE 8

Aspheric Coefficients

| Surface # | 2 | 3 | 4 | 5 | 7 |
|---|---|---|---|---|---|
| k = | 1.66739E−01 | 8.27246E+00 | 9.90000E+01 | 4.41196E+00 | −9.00128E+01 |
| A4 = | −2.168082465E−04 | −3.763223132E−03 | −1.418254226E−02 | −1.472000880E−02 | −7.581401865E−03 |
| A6 = | 2.239675357E−04 | 2.215214259E−04 | 5.926003575E−03 | 7.312644566E−03 | −1.694524157E−03 |
| A8 = | −1.269460556E−04 | 6.219427978E−04 | −1.409847517E−03 | −2.491672506E−03 | 1.599373746E−03 |
| A10 = | 4.296367941E−05 | −4.267013351E−04 | 3.000800762E−04 | 8.558709957E−04 | −1.103036595E−03 |
| A12 = | 6.982131582E−06 | 1.319973597E−04 | −6.123047869E−05 | −2.171426226E−04 | 3.748120958E−04 |
| A14 = | 4.114638364E−07 | −1.974851886E−05 | 1.049919086E−05 | 3.246835842E−05 | −6.672659640E−05 |
| A16 = | | 1.142259355E−06 | −8.423840977E−07 | −1.901271924E−06 | 4.887094876E−06 |

| Surface # | 8 | 9 | 10 | 11 | 12 |
|---|---|---|---|---|---|
| k = | −5.48687E+01 | −6.30741E+01 | −5.15098E+01 | −2.95658E+01 | −1.14481E+01 |
| A4 = | −1.283232600E−02 | −2.803368045E−02 | −2.194912228E−02 | −4.079957521E−03 | −3.741332363E−03 |
| A6 = | 2.261832164E−03 | 1.183610122E−02 | 6.812904739E−03 | 5.815816969E−03 | 1.000217264E−03 |
| A8 = | −1.895787633E−03 | −1.237846473E−02 | −5.004668741E−03 | −4.046313411E−03 | 1.368831774E−03 |
| A10 = | 7.117155138E−04 | 8.454469669E−03 | 2.503851431E−03 | 1.400978906E−03 | 5.834183608E−04 |
| A12 = | −1.587011082E−04 | −3.665592955E−03 | −7.987548794E−04 | −3.021218930E−04 | −1.314864237E−04 |
| A14 = | 1.851341571E−05 | 1.006786874E−03 | 1.641381015E−04 | 4.182710706E−05 | 1.778607334E−05 |
| A16 = | −8.737380755E−07 | −1.684899884E−04 | −2.082691187E−05 | −3.597445830E−06 | 1.484904921E−06 |
| A18 = | | 1.560659411E−05 | 1.472059355E−06 | 1.739285485E−07 | 7.506211195E−08 |
| A20 = | | −6.116583810E−07 | −4.395179323E−08 | −3.588950952E−09 | 2.113217373E−09 |
| A22 = | | | | | 2.550633361E−11 |

| Surface # | 13 | 14 | 15 | 16 |
|---|---|---|---|---|
| k = | −1.62701E−02 | 0.00000E+00 | −6.39105E−01 | −1.24180E+01 |
| A4 = | 1.561207002E−02 | −4.478466369E−03 | −2.276096304E−02 | −2.195289356E−02 |
| A6 = | −8.352099778E−03 | 3.464375573E−03 | 7.102507125E−03 | 6.296177801E−03 |
| A8 = | 1.113811998E−03 | −2.949373399E−03 | −1.721673702E−03 | −1.336234910E−03 |
| A10 = | 2.575144930E−05 | 9.845211187E−04 | 2.420032654E−04 | 1.827961228E−04 |
| A12 = | −3.537331634E−05 | −2.001121072E−04 | −1.937903030E−05 | −1.671642725E−05 |
| A14 = | 6.814234476E−06 | 2.773436576E−05 | 8.318273954E−07 | 1.063294260E−06 |
| A16 = | −7.540356362E−07 | −2.726887021E−06 | −7.395390720E−09 | 4.785619578E−08 |
| A18 = | 5.337006007E−08 | 1.924874767E−07 | −1.299083285E−09 | 1.514417494E−09 |
| A20 = | −2.404867201E−09 | −9.722307211E−09 | 8.661145103E−11 | −3.249884375E−11 |
| A22 = | 6.559781521E−11 | 3.456315789E−10 | −2.918540400E−12 | 4.271489305E−13 |
| A24 = | −9.664017738E−13 | −8.364076619E−12 | 6.087574029E−14 | −2.235784410E−15 |
| A26 = | 5.695693016E−15 | 1.294808299E−13 | −7.949332066E−16 | −2.181943403E−17 |

TABLE 8-continued

| Aspheric Coefficients | | | |
|---|---|---|---|
| A28 = | −1.133588253E−15 | 5.992620505E−18 | 4.123517476E−19 |
| A30 = | 4.119276158E−18 | −1.999409436E−20 | −1.931134402E−21 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 8.71 | \|f/f3\| + \|f/f4\| | 0.43 |
| Fno | 1.97 | f1/R1 + f1/R2 | 3.16 |
| HFOV [degrees] | 42.6 | f2/f | −2.44 |
| (V5 + V6)/V4 | 6.09 | f5/f | 1.16 |
| (CT1 + CT2 + CT3 + CT4 + CT5 + CT6)/T67 | 2.76 | f6/f1 | −7.70 |
| T23/T12 | 1.31 | f6/R11 + f6/R12 | −21.40 |
| T67/T23 | 3.81 | f7/R13 + f7/R14 | −0.29 |
| TL/EPD | 2.36 | Y72/Y11 | 3.00 |
| TL/f | 1.20 | Yc61/Y61 | 0.50 |
| TL/ImgH | 1.28 | Yc62/Y62 | 0.46 |
| ΣAT/T23 | 8.94 | Yc72/Y72 | 0.29 |
| ΣCT/ΣAT | 1.39 | | |

5th Embodiment

Figure 9:
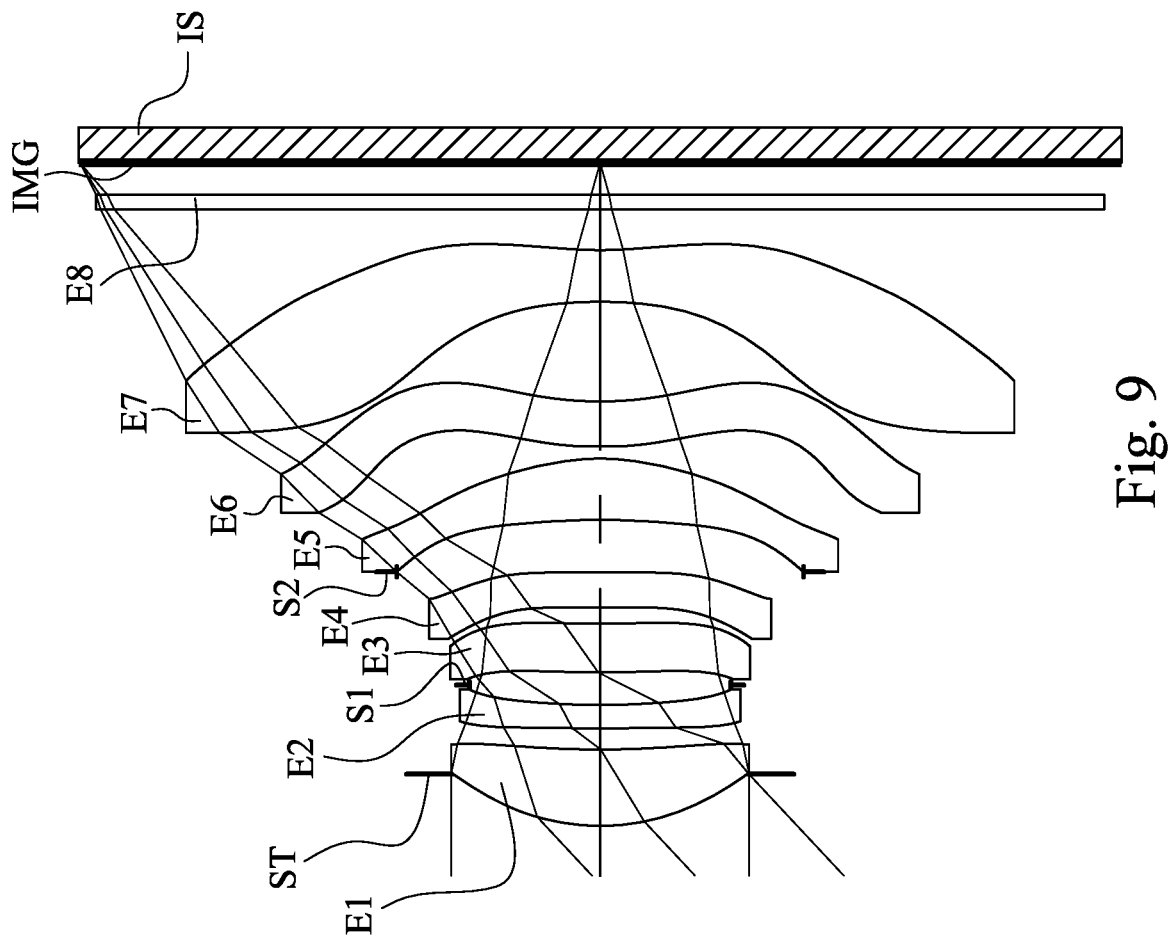
FIG. 9 is a schematic view of an imaging apparatus according to the 5th embodiment of the present disclosure.
Figure 10:
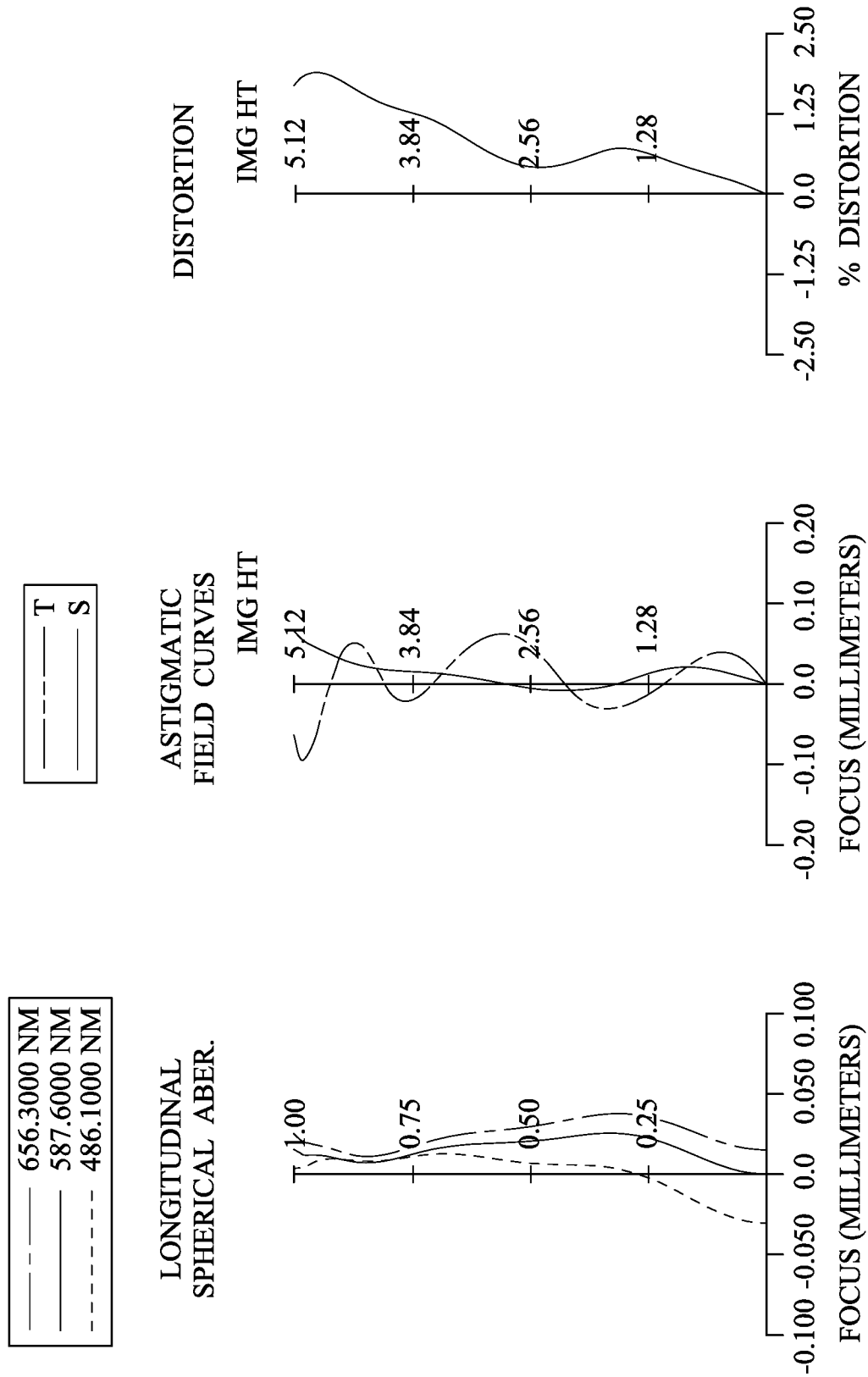
FIG. 10 shows spherical aberration curves, astigmatic field curves and a distortion curve of the imaging apparatus according to the 5th embodiment.

FIG. 9 is a schematic view of an imaging apparatus 5 according to the 5th embodiment of the present disclosure. FIG. 10 shows spherical aberration curves, astigmatic field curves and a distortion curve of the imaging apparatus 5 according to the 5th embodiment. In FIG. 9, the imaging apparatus 5 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes two inflection points.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes one inflection point and one critical point in an oft-axis region thereof.

The filter E8 is made of a glass material, which is located between the seventh lens element E7 and the image surface IMG in order, and will not affect the focal length of the optical imaging system assembly.

The detailed optical data of the 5th embodiment are shown in Table 9 and the aspheric surface data are shown in Table 10 below.

TABLE 9

5th Embodiment
f = 5.39 mm, Fno = 1.84, HFOV = 43.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.508 |  |  |  |  |
| 2 | Lens 1 | 2.2385 | ASP | 0.750 | Plastic | 1.545 | 56.1 | 5.40 |
| 3 |  | 8.2284 | ASP | 0.209 |  |  |  |  |
| 4 | Lens 2 | 15.8550 | ASP | 0.229 | Plastic | 1.686 | 18.4 | −15.17 |
| 5 |  | 6.2455 | ASP | 0.198 |  |  |  |  |
| 6 | Stop | Plano |  | 0.124 |  |  |  |  |
| 7 | Lens 3 | 10.1653 | ASP | 0.479 | Plastic | 1.544 | 56.0 | −316.64 |
| 8 |  | 9.4395 | ASP | 0.158 |  |  |  |  |
| 9 | Lens 4 | 14.1928 | ASP | 0.345 | Plastic | 1.686 | 18.4 | 93.06 |
| 10 |  | 18.0693 | ASP | 0.007 |  |  |  |  |
| 11 | Stop | Plano |  | 0.513 |  |  |  |  |
| 12 | Lens 5 | −7.3225 | ASP | 0.602 | Plastic | 1.544 | 56.0 | 5.74 |
| 13 |  | −2.2525 | ASP | 0.119 |  |  |  |  |
| 14 | Lens 6 | 4.3990 | ASP | 0.444 | Plastic | 1.544 | 56.0 | −39.99 |
| 15 |  | 3.5290 | ASP | 0.980 |  |  |  |  |
| 16 | Lens 7 | −5.3939 | ASP | 0.509 | Plastic | 1.534 | 56.0 | −4.19 |
| 17 |  | 3.9587 | ASP | 0.400 |  |  |  |  |
| 18 | Filter | Plano |  | 0.145 | Glass | 1.517 | 64.2 | — |
| 19 |  | Plano |  | 0.316 |  |  |  |  |
| 20 | Image | Plano |  | — |  |  |  |  |

Reference wavelength is 587.6 nm (d-line).
Effective radius of Surface 6 (stop S1) is 1.285 mm.
Effective radius of Surface 11 (stop S2) is 2.000 mm.

TABLE 10

Aspheric Coefficients

| Surface # | 2 | 3 | 4 | 5 | 7 |
|---|---|---|---|---|---|
| k = | 3.88221E−02 | −3.85864E+00 | 9.33827E+01 | 7.66443E+00 | −8.92496E+01 |
| A4 = | −1.302602543E−03 | −1.843688353E−02 | −6.218797748E−02 | −5.312952999E−02 | −3.509645726E−02 |
| A6 = | 2.314499231E−03 | 3.602807736E−03 | 6.275819742E−02 | 3.571013613E−02 | 8.602615774E−03 |
| A8 = | −7.773952332E−04 | 8.954501068E−03 | −2.776468709E−02 | 4.371626350E−02 | −1.002907606E−02 |
| A10 = | −1.700933905E−03 | −1.691261113E−02 | −7.482247312E−05 | −9.561774234E−02 | −7.329259914E−03 |
| A12 = | 1.353150743E−03 | 1.231550573E−02 | 9.528089069E−03 | 8.091934066E−02 | 1.375766382E−02 |
| A14 = | −3.982695088E−04 | −4.388122331E−03 | −4.832060871E−03 | −3.268768168E−02 | −8.265854629E−03 |
| A16 = |  | 5.899646202E−04 | 7.860488629E−04 | 5.322178641E−03 | 1.773618738E−03 |

| Surface # | 8 | 9 | 10 | 12 | 13 |
|---|---|---|---|---|---|
| k = | −9.90000E+01 | −5.67300E+00 | −6.82930E+00 | −4.71403E+01 | −1.14987E+01 |
| A4 = | −1.053551013E−01 | −1.551062881E−01 | −9.500181541E−02 | −2.561730874E−02 | −2.394949889E−02 |
| A6 = | 1.813343925E−01 | 1.494998672E−01 | 6.325996651E−02 | 1.001757207E−01 | 2.270104259E−02 |
| A8 = | −3.159664004E−01 | −2.323744009E−01 | −9.603884652E−02 | −1.628318840E−01 | −3.633924616E−02 |
| A10 = | 3.148418749E−01 | 2.311382196E−01 | 1.022161675E−01 | 1.389092126E−01 | 2.940847560E−02 |
| A12 = | −1.820985166E−01 | −1.368085981E−01 | −6.925754023E−02 | −7.462426965E−02 | −1.409655401E−02 |
| A14 = | 5.569837476E−02 | 5.258811144E−02 | 3.185159196E−02 | 2.594729852E−02 | 4.272087026E−03 |
| A16 = | −6.934390374E−03 | −1.588555368E−02 | −9.762002687E−03 | −5.662747269E−03 | −8.189208901E−04 |
| A18 = |  | 4.042308869E−03 | 1.782554380E−03 | 7.026075327E−04 | 9.614759649E−05 |
| A20 = |  | −5.477910236E−04 | −1.433343316E−04 | −3.759777176E−05 | −6.339358425E−06 |
| A22 = |  |  |  |  | 1.811057841E−07 |

| Surface # | 14 | 15 | 16 | 17 |
|---|---|---|---|---|
| k = | 2.10262E−02 | 0.00000E+00 | −6.64750E−01 | −1.35078E+01 |
| A4 = | 5.365953506E−02 | −1.620613257E−02 | −9.634209669E−02 | −9.137425082E−02 |
| A6 = | −5.986391812E−02 | 3.441866330E−02 | 8.089546737E−02 | 6.931012374E−02 |
| A8 = | −8.014631842E−03 | −7.751875992E−02 | −5.270559595E−02 | 3.906619092E−02 |
| A10 = | 3.407021708E−02 | 6.619731706E−02 | 2.027169315E−02 | 1.430996157E−02 |
| A12 = | −2.458067682E−02 | −3.412180266E−02 | −4.689800841E−03 | −3.549585595E−03 |

TABLE 10-continued

| Aspheric Coefficients | | | |
|---|---|---|---|
| A14 = | 1.015605953E−02 | 1.189464006E−02 | 6.804803633E−04 | 6.222915746E−04 |
| A16 = | −2.737462935E−03 | −2.914325044E−03 | −6.045597505E−05 | −7.882738550E−05 |
| A18 = | 4.923008681E−04 | 5.069413778E−04 | 2.576128226E−06 | 7.250373573E−06 |
| A20 = | −5.818431292E−05 | −6.217088764E−05 | 7.583898234E−08 | −4.798649870E−07 |
| A22 = | 4.316328463E−06 | 5.249818974E−06 | −1.862668232E−08 | 2.231129378E−08 |
| A24 = | −1.814758288E−07 | −2.907532135E−07 | 1.270352012E−09 | −6.958910418E−10 |
| A26 = | 3.287242072E−09 | 9.567833044E−09 | −4.701097808E−11 | 1.332874600E−11 |
| A28 = | | −1.467469758E−10 | 9.511151874E−13 | −1.289799705E−13 |
| A30 = | | 2.630565676E−13 | −8.288711561E−15 | 3.244419658E−16 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 5.39 | |f/f3| + |f/f4| | 0.07 |
| Fno | 1.84 | f1/R1 + f1/R2 | 3.07 |
| HFOV [degrees] | 43.0 | f2/f | −2.82 |
| (V5 + V6)/V4 | 6.09 | f5/f | 1.07 |
| (CT1 + CT2 + CT3 + CT4 + CT5 + CT6)/T67 | 2.91 | f6/f1 | −7.40 |
| T23/T12 | 1.54 | f6/R11 + f6/R12 | −20.42 |
| T67/T23 | 3.04 | f7/R13 + f7/R14 | −0.28 |
| TL/EPD | 2.23 | Yc61/Y61 | 0.50 |
| TL/f | 1.21 | Yc62/Y62 | 0.47 |
| TL/ImgH | 1.27 | Yc72/Y72 | 0.28 |
| ΣAT/T23 | 7.17 | | |
| ΣCT/ΣAT | 1.45 | | |

6th Embodiment

Figure 11:
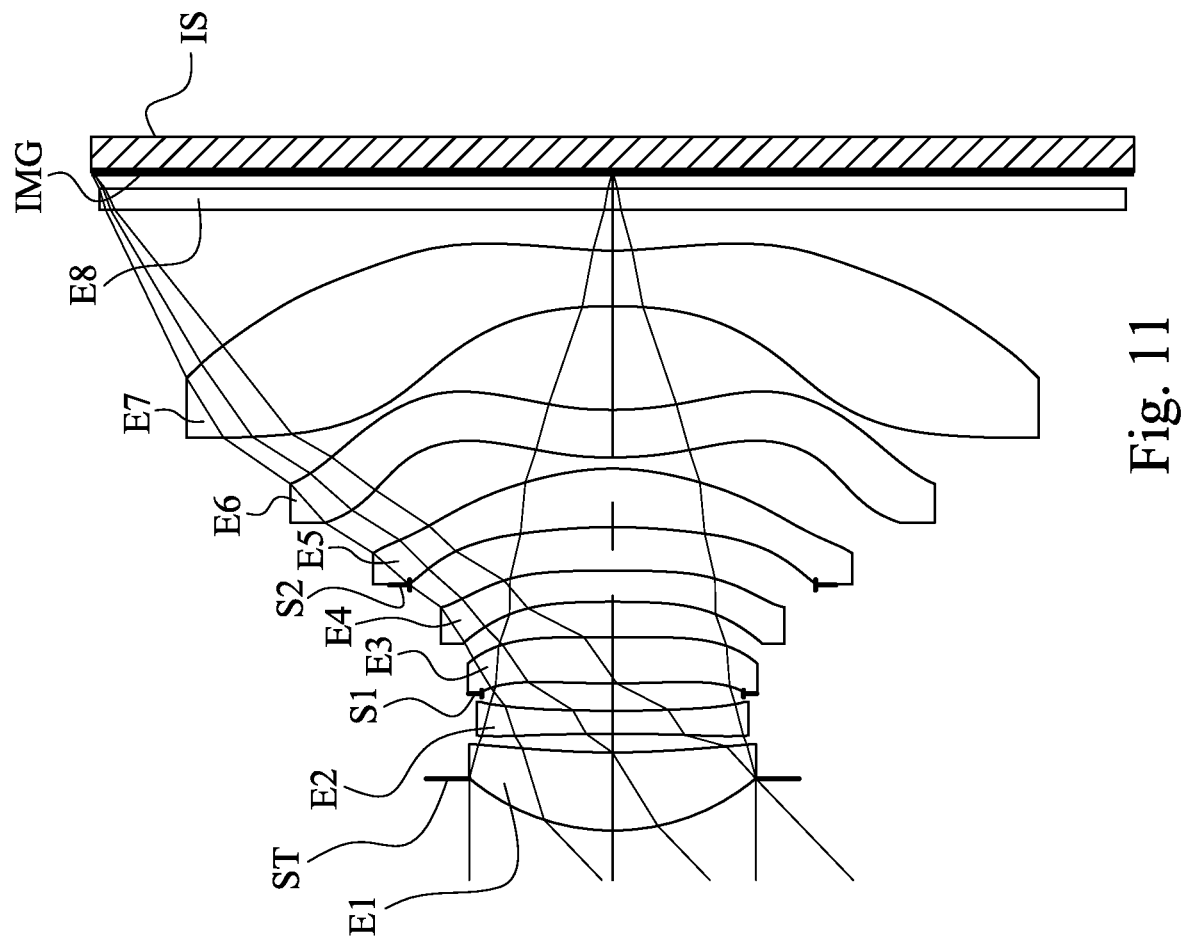
FIG. 11 is a schematic view of an imaging apparatus according to the 6th embodiment of the present disclosure.
Figure 12:
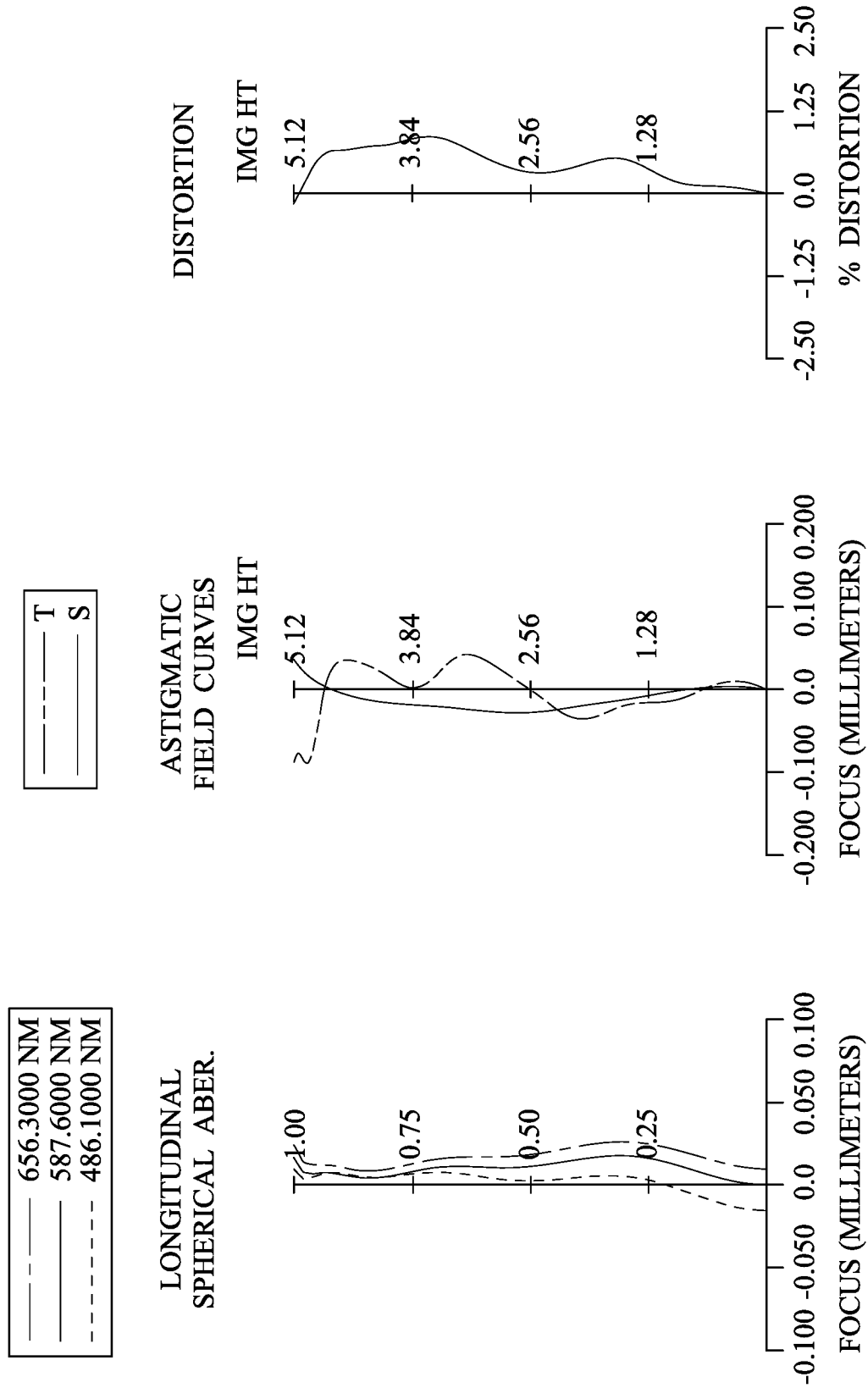
FIG. 12 shows spherical aberration curves, astigmatic field curves and a distortion curve of the imaging apparatus according to the 6th embodiment.

FIG. 11 is a schematic view of an imaging apparatus 6 according to the 6th embodiment of the present disclosure. FIG. 12 shows spherical aberration curves, astigmatic field curves and a distortion curve of the imaging apparatus 6 according to the 6th embodiment. In FIG. 11, the imaging apparatus 6 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the image-side surface of the first lens element E1 includes one inflection point.

The second lens element E2 with negative refractive power has an object-side surface being concave in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes two inflection points and one critical point in an off-axis region thereof.

The filter E8 is made of a glass material, which is located between the seventh lens element E7 and the image surface IMG in order, and will not affect the focal length of the optical imaging system assembly.

The detailed optical data of the 6th embodiment are shown in Table 11 and the aspheric surface data are shown in Table 12 below.

TABLE 11

6th Embodiment
f = 5.34 mm, Fno = 1.89, HFOV = 43.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.510 | | | | |
| 2 | Lens 1 | 2.2235 | ASP | 0.770 | Plastic | 1.545 | 56.1 | 5.38 |
| 3 | | 8.0870 | ASP | 0.183 | | | | |
| 4 | Lens 2 | −200.0000 | ASP | 0.226 | Plastic | 1.660 | 20.4 | −13.51 |
| 5 | | 9.3377 | ASP | 0.172 | | | | |
| 6 | Stop | Plano | | 0.100 | | | | |
| 7 | Lens 3 | 9.1908 | ASP | 0.457 | Plastic | 1.544 | 56.0 | 17.44 |
| 8 | | 288.1742 | ASP | 0.349 | | | | |
| 9 | Lens 4 | −17.1338 | ASP | 0.307 | Plastic | 1.680 | 18.2 | −35.95 |
| 10 | | −57.6719 | ASP | −0.141 | | | | |
| 11 | Stop | Plano | | 0.572 | | | | |
| 12 | Lens 5 | −5.6371 | ASP | 0.577 | Plastic | 1.544 | 56.0 | 6.54 |
| 13 | | −2.2604 | ASP | 0.110 | | | | |
| 14 | Lens 6 | 4.3448 | ASP | 0.469 | Plastic | 1.544 | 56.0 | −43.87 |
| 15 | | 3.5359 | ASP | 1.023 | | | | |
| 16 | Lens 7 | −5.3893 | ASP | 0.548 | Plastic | 1.534 | 56.0 | −4.11 |
| 17 | | 3.8445 | ASP | 0.400 | | | | |
| 18 | Filter | Plano | | 0.210 | Glass | 1.517 | 64.2 | — |
| 19 | | Plano | | 0.166 | | | | |
| 20 | Image | Plano | | — | | | | |

Reference wavelength is 587.6 nm (d-line).
Effective radius of Surface 6 (stop S1) is 1.290 mm.
Effective radius of Surface 11 (stop S2) is 2.000 mm.

TABLE 12

Aspheric Coefficients

| Surface # | 2 | 3 | 4 | 5 | 7 |
|---|---|---|---|---|---|
| k = | 1.53610E−01 | 2.64119E+00 | 9.90000E+01 | 7.61787E+00 | −8.60495E+01 |
| A4 = | −2.593426927E−03 | −1.847536646E−02 | −6.666414585E−02 | −6.391954072E−02 | −3.376492983E−02 |
| A6 = | 4.239389934E−03 | 4.382980914E−03 | 1.000761185E−01 | 9.261502217E−02 | −1.705859464E−02 |
| A8 = | −2.462999204E−03 | 4.785598674E−03 | −1.058324011E−01 | −8.294065070E−02 | 3.065444049E−02 |
| A10 = | −5.899531747E−05 | −2.768670624E−03 | 9.885470048E−02 | 6.602541122E−02 | −4.020343502E−02 |
| A12 = | 7.559678101E−04 | −2.366912199E−03 | −6.506937387E−02 | −3.981749109E−02 | 2.453934373E−02 |
| A14 = | −2.566221347E−04 | 2.209962586E−03 | 2.436391004E−02 | 1.408101582E−02 | −8.784954395E−03 |
| A16 = | | −4.856528642E−04 | −3.736025930E−03 | −1.942679610E−03 | 1.498439903E−03 |

| Surface # | 8 | 9 | 10 | 12 | 13 |
|---|---|---|---|---|---|
| k = | −7.12562E+01 | −7.00967E+01 | −3.06709E+01 | −3.49599E+01 | −1.14591E+01 |
| A4 = | −6.359134040E−02 | −1.380483169E−01 | −1.106099037E−01 | −2.222127641E−02 | −1.924249884E−02 |
| A6 = | 6.751442965E−02 | 2.028923879E−01 | 1.448541250E−01 | 5.919684634E−02 | 7.513541975E−03 |
| A8 = | −1.339413061E−01 | −4.472717041E−01 | −2.516692915E−01 | −8.075392712E−02 | −1.486305874E−02 |
| A10 = | 1.357824151E−01 | 6.364725235E−01 | 2.801878052E−01 | 5.534529114E−02 | 1.243087947E−02 |
| A12 = | −8.071755011E−02 | −5.970421216E−01 | −2.033749087E−01 | −2.486088492E−02 | −5.919621232E−03 |
| A14 = | 2.560018505E−02 | 3.689193445E−01 | 9.739276141E−02 | 7.890654773E−03 | 1.765571509E−03 |
| A16 = | −3.326410734E−03 | −1.436649856E−01 | −2.944839150E−02 | −1.719246771E−03 | −3.259547558E−04 |
| A18 = | | 3.189076140E−02 | 5.057706757E−03 | 2.250535565E−04 | 3.576041032E−05 |
| A20 = | | −3.076650606E−03 | −3.731102289E−04 | −1.292642149E−05 | −2.137707158E−06 |
| A22 = | | | | | 5.412073071E−08 |

| Surface # | 14 | 15 | 16 | 17 |
|---|---|---|---|---|
| k = | 2.80351E−02 | 0.00000E+00 | −6.55432E−01 | −1.11524E+01 |
| A4 = | 5.855662443E−02 | −1.912494854E−02 | −9.235777978E−02 | −8.503686363E−02 |

TABLE 12-continued

| Aspheric Coefficients | | | | |
|---|---|---|---|---|
| A6 = | −8.206425309E−02 | 3.151597208E−02 | 6.812205688E−02 | 5.769880940E−02 |
| A8 = | 3.241493172E−02 | −6.450409102E−02 | −3.709010743E−02 | −2.807867371E−02 |
| A10 = | −4.429155629E−03 | 5.082344475E−02 | 9.956433745E−03 | 8.431588646E−03 |
| A12 = | −2.244012082E−03 | −2.395599919E−02 | −4.595678708E−04 | −1.557004503E−03 |
| A14 = | 1.675772480E−03 | 7.481547564E−03 | −4.777647074E−04 | 1.652588775E−04 |
| A16 = | −5.601987119E−04 | −1.575450474E−03 | 1.601286393E−04 | −5.258206958E−06 |
| A18 = | 1.113337992E−04 | 2.159090277E−04 | −2.728519048E−05 | −1.213360759E−06 |
| A20 = | −1.343210646E−05 | −1.662118368E−05 | 2.970053266E−06 | 2.191912196E−07 |
| A22 = | 9.419033656E−07 | 1.668460329E−07 | −2.181337400E−07 | −1.878539096E−08 |
| A24 = | −3.400147342E−08 | 1.031949241E−07 | 1.082286794E−08 | 9.811604920E−10 |
| A26 = | 4.488133792E−10 | −1.055668306E−08 | −3.490460436E−10 | −3.178565942E−11 |
| A28 = | | 4.619326491E−10 | 6.622216917E−12 | 5.898862717E−13 |
| A30 = | | −7.987169026E−12 | −5.617997679E−14 | −4.810900041E−15 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.34 | |f/f3| + |f/f4| | 0.45 |
| Fno | 1.89 | f1/R1 + f1/R2 | 3.08 |
| HFOV [degrees] | 43.8 | f2/f | −2.53 |
| (V5 + V6)/V4 | 6.16 | f5/f | 1.22 |
| (CT1 + CT2 + CT3 + CT4 + CT5 + CT6)/T67 | 2.74 | f6/f1 | −8.16 |
| T23/T12 | 1.49 | f6/R11 + f6/R12 | −22.51 |
| T67/T23 | 3.76 | f7/R13 + f7/R14 | −0.31 |
| TL/EPD | 2.30 | Y72/Y11 | 2.97 |
| TL/f | 1.22 | Yc61/Y61 | 0.50 |
| TL/ImgH | 1.27 | Yc62/Y62 | 0.46 |
| ΣAT/T23 | 8.71 | Yc72/Y72 | 0.29 |
| ΣCT/ΣAT | 1.42 | | |

7th Embodiment

Figure 13:
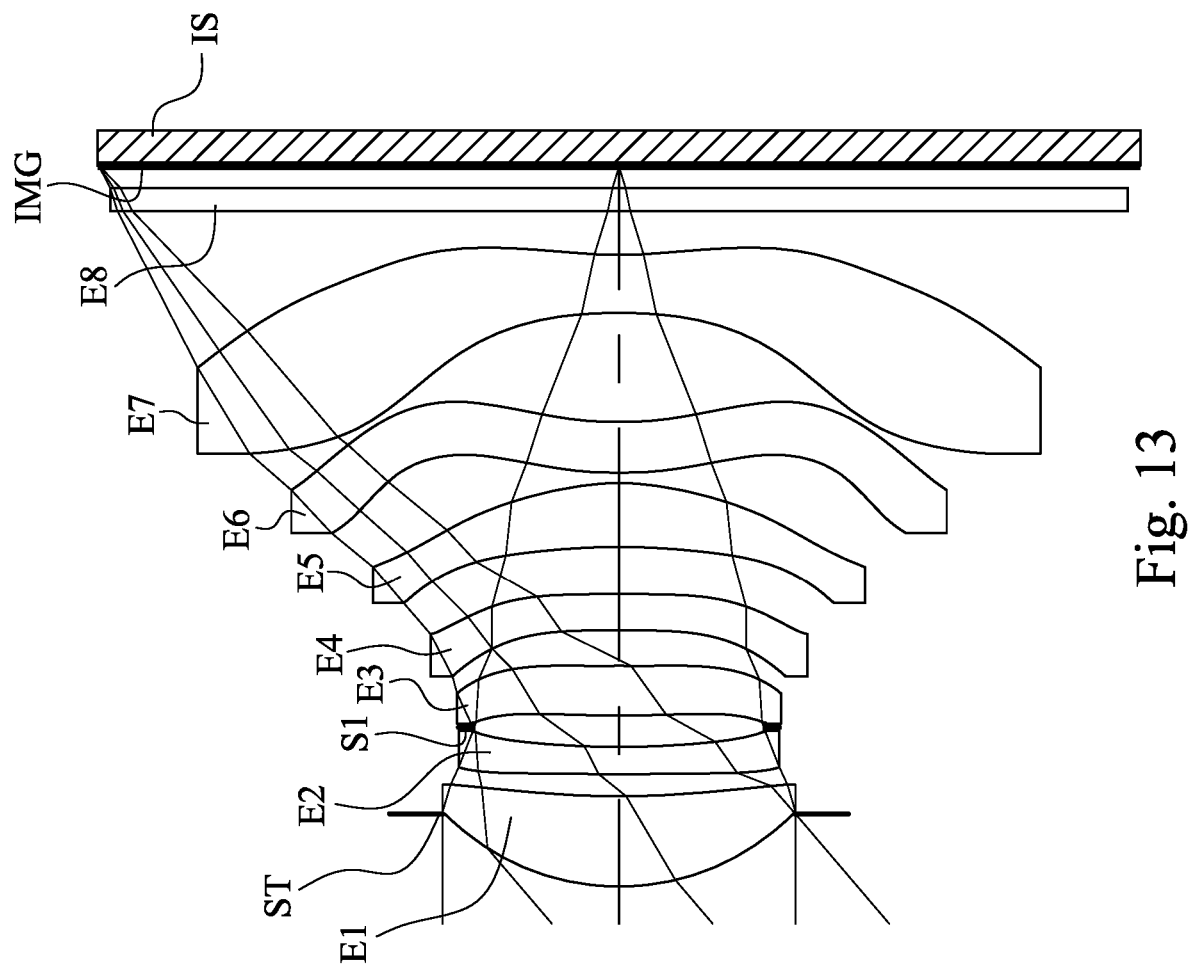
FIG. 13 is a schematic view of an imaging apparatus according to the 7th embodiment of the present disclosure.
Figure 14:
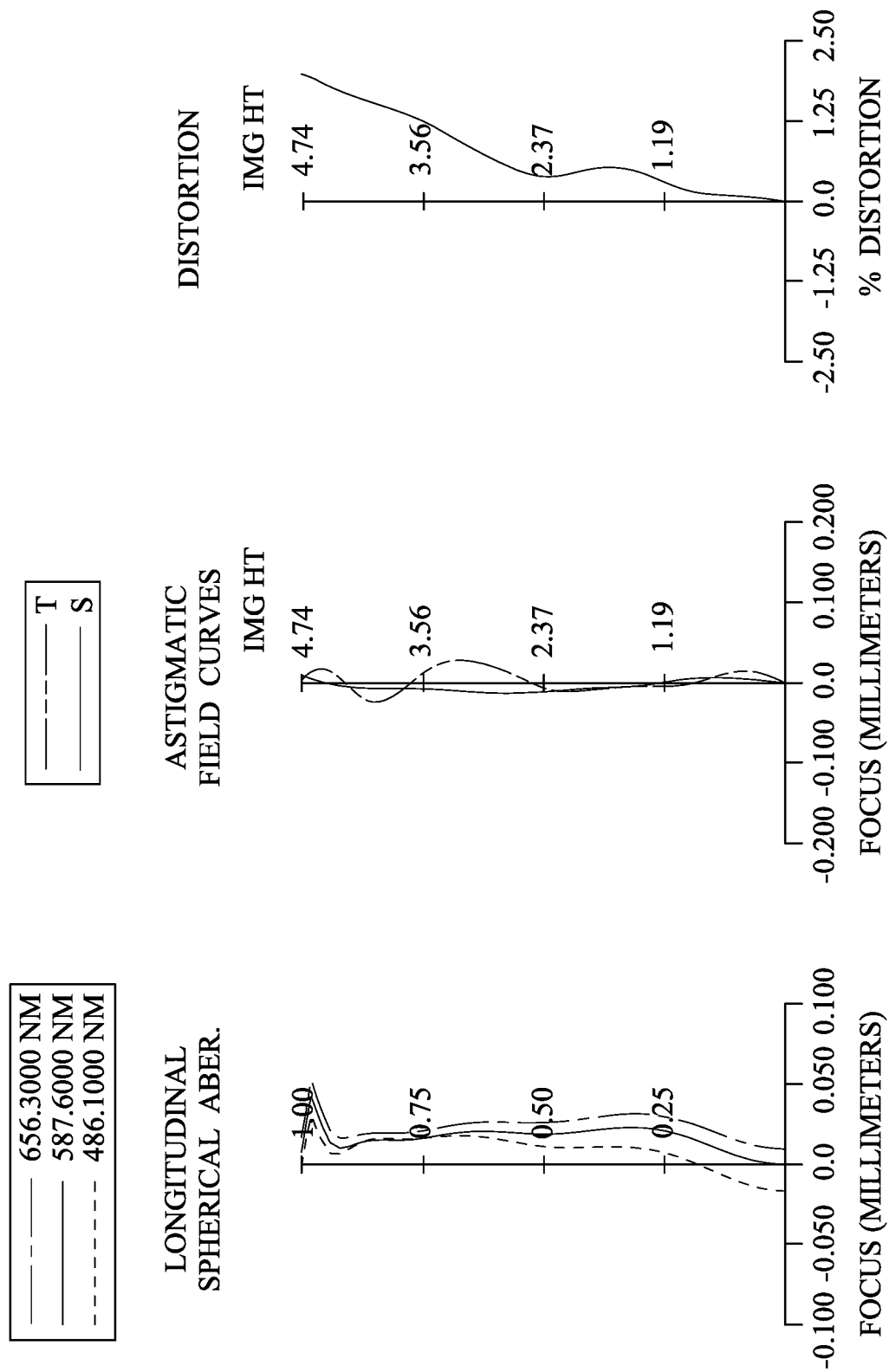
FIG. 14 shows spherical aberration curves, astigmatic field curves and a distortion curve of the imaging apparatus according to the 7th embodiment.

FIG. 13 is a schematic view of an imaging apparatus 7 according to the 7th embodiment of the present disclosure. FIG. 14 shows spherical aberration curves, astigmatic field curves and a distortion curve of the imaging apparatus 7 according to the 7th embodiment. In FIG. 13, the imaging apparatus 7 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes one inflection point and one critical point in an off-axis region thereof.

The filter E8 is made of a glass material, which is located between the seventh lens element E7 and the image surface IMG in order, and will not affect the focal length of the optical imaging system assembly.

The detailed optical data of the 7th embodiment are shown in Table 13 and the aspheric surface data are shown in Table 14 below.

TABLE 13

7th Embodiment
f = 5.44 mm, Fno = 1.69, HFOV = 40.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.662 | | | | |
| 2 | Lens 1 | 2.2496 | ASP | 0.824 | Plastic | 1.545 | 56.1 | 5.48 |
| 3 | | 7.9514 | ASP | 0.201 | | | | |
| 4 | Lens 2 | 18.3366 | ASP | 0.247 | Plastic | 1.686 | 18.4 | −14.56 |
| 5 | | 6.4302 | ASP | 0.180 | | | | |
| 6 | Stop | Plano | | 0.107 | | | | |
| 7 | Lens 3 | 9.0546 | ASP | 0.455 | Plastic | 1.545 | 56.1 | 22.24 |
| 8 | | 35.1798 | ASP | 0.324 | | | | |
| 9 | Lens 4 | −26.3236 | ASP | 0.330 | Plastic | 1.686 | 18.4 | −43.68 |
| 10 | | −217.4754 | ASP | 0.436 | | | | |
| 11 | Lens 5 | −6.0180 | ASP | 0.582 | Plastic | 1.544 | 56.0 | 6.31 |
| 12 | | −2.2610 | ASP | 0.095 | | | | |
| 13 | Lens 6 | 4.3783 | ASP | 0.463 | Plastic | 1.544 | 56.0 | −41.93 |
| 14 | | 3.5364 | ASP | 0.994 | | | | |
| 15 | Lens 7 | −5.3874 | ASP | 0.529 | Plastic | 1.534 | 56.0 | −4.11 |
| 16 | | 3.8295 | ASP | 0.400 | | | | |
| 17 | Filter | Plano | | 0.210 | Glass | 1.517 | 64.2 | — |
| 18 | | Plano | | 0.205 | | | | |
| 19 | Image | Plano | | — | | | | |

Reference wavelength is 587.6 nm (d-line).
Effective radius of Surface 6 (stop S1) is 1.33 mm.

TABLE 14

Aspheric Coefficients

| Surface # | 2 | 3 | 4 | 5 | 7 |
|---|---|---|---|---|---|
| k = | 1.38095E−01 | 5.73555E+00 | 9.21025E+01 | 4.16531E+00 | −9.24627E+01 |
| A4 = | −4.878668882E−04 | −1.561322881E−02 | −5.863163019E−02 | −5.262760502E−02 | −2.841561624E−02 |
| A6 = | −1.852439215E−03 | 5.679142995E−03 | 8.099605699E−02 | 5.766597361E−02 | −1.593346134E−02 |
| A8 = | 4.917504139E−03 | 8.247440783E−04 | −8.619898698E−02 | −2.515881628E−02 | 3.186326477E−02 |
| A10 = | −4.512382927E−03 | −7.989868885E−04 | 7.673489727E−02 | −2.205832623E−03 | −4.719592746E−02 |
| A12 = | 1.902107265E−03 | −1.333744408E−03 | −4.537771844E−02 | 1.136494723E−02 | 3.595173773E−02 |
| A14 = | −3.234412223E−04 | 1.016008019E−03 | 1.500021671E−02 | −6.565411291E−03 | −1.508122930E−02 |
| A16 = | | −2.004144980E−04 | −2.031404181E−03 | 1.447157337E−03 | 2.708737417E−03 |

| Surface # | 8 | 9 | 10 | 11 | 12 |
|---|---|---|---|---|---|
| k = | 9.15033E+01 | −9.63474E+01 | 9.31676E+01 | −3.62535E+01 | −1.15743E+01 |
| A4 = | −5.701062839E−02 | −1.121519472E−01 | −9.270731710E−02 | −2.263718117E−02 | −2.210786609E−02 |
| A6 = | 4.200499708E−02 | 1.158764268E−01 | 1.005862663E−01 | 6.998512539E−02 | 1.665924559E−02 |
| A8 = | −8.774914964E−02 | −2.567365871E−01 | −1.837481456E−01 | −1.051085514E−01 | −2.925364620E−02 |
| A10 = | 9.450367073E−02 | 3.601803546E−01 | 2.092051765E−01 | 8.027963333E−02 | 2.449452830E−02 |
| A12 = | −5.914667477E−02 | −3.268052284E−01 | −1.505983237E−01 | −3.900366623E−02 | −1.197969188E−02 |
| A14 = | 1.938042614E−02 | 1.964374022E−01 | 7.044810620E−02 | 1.263897653E−02 | 3.686750845E−03 |
| A16 = | −2.562929566E−03 | −7.577136546E−02 | −2.075901558E−02 | −2.659951738E−03 | −7.140555180E−04 |
| A18 = | | 1.694590372E−02 | 3.485788608E−03 | 3.267991591E−04 | 8.428281273E−05 |
| A20 = | | −1.661474689E−03 | −2.521605522E−04 | −1.756935631E−05 | −5.562616837E−06 |
| A22 = | | | | | 1.585191381E−07 |

TABLE 14-continued

| Aspheric Coefficients | | | | |
|---|---|---|---|---|
| Surface # | 13 | 14 | 15 | 16 |
| k = | 3.67897E−02 | 0.00000E+00 | −6.57578E−01 | −1.28108E+01 |
| A4 = | 5.500050748E−02 | −1.825380351E−02 | −9.542663388E−02 | −9.080670235E−02 |
| A6 = | −6.738120147E−02 | 3.479734738E−02 | 7.970965663E−02 | 6.848698351E−02 |
| A8 = | 8.112521067E−03 | −7.236872343E−02 | −5.151056607E−02 | −3.734383255E−02 |
| A10 = | 1.788874874E−02 | 5.906217382E−02 | 1.951171895E−02 | 1.297952012E−02 |
| A12 = | −1.498434971E−02 | −2.913939871E−02 | −4.382615387E−03 | −3.004761268E−03 |
| A14 = | 6.471353124E−03 | 9.667992892E−03 | 5.964559590E−04 | 4.844646167E−04 |
| A16 = | −1.785635956E−03 | −2.227395638E−03 | −4.425613711E−05 | −5.563219342E−05 |
| A18 = | 3.255031290E−04 | 3.566186871E−04 | 3.315227513E−07 | 4.553440270E−06 |
| A20 = | −3.867239392E−05 | 3.870725601E−05 | 3.002133389E−07 | −2.597521213E−07 |
| A22 = | 2.861487658E−06 | 2.660907939E−06 | −3.465061826E−08 | 9.723063911E−09 |
| A24 = | −1.191115706E−07 | −9.384630914E−08 | 2.066855856E−09 | −2.018850786E−10 |
| A26 = | 2.120389394E−09 | −2.406810421E−10 | −7.316368042E−11 | 6.649367324E−13 |
| A28 = | | 1.410044883E−10 | 1.460604171E−12 | 6.177703027E−14 |
| A30 = | | −3.503391011E−12 | −1.274552617E−14 | −9.536567161E−16 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.44 | \|f/f3\| + \|f/f4\| | 0.37 |
| Fno | 1.69 | f1/R1 + f1/R2 | 3.12 |
| HFOV [degrees] | 40.5 | f2/f | −2.68 |
| (V5 + V6)/V4 | 6.09 | f5/f | 1.16 |
| (CT1 + CT2 + CT3 + CT4 + CT5 + CT6)/T67 | 2.92 | f6/f1 | −7.65 |
| T23/T12 | 1.43 | f6/R11 + f6/R12 | −21.43 |
| T67/T23 | 3.46 | f7/R13 + f7/R14 | −0.31 |
| TL/EPD | 2.05 | Y72/Y11 | 2.39 |
| TL/f | 1.21 | Yc61/Y61 | 0.54 |
| TL/ImgH | 1.39 | Yc62/Y62 | 0.50 |
| ΣAT/T23 | 8.14 | Yc72/Y72 | 0.31 |
| ΣCT/ΣAT | 1.47 | | |

8th Embodiment

Figure 15:
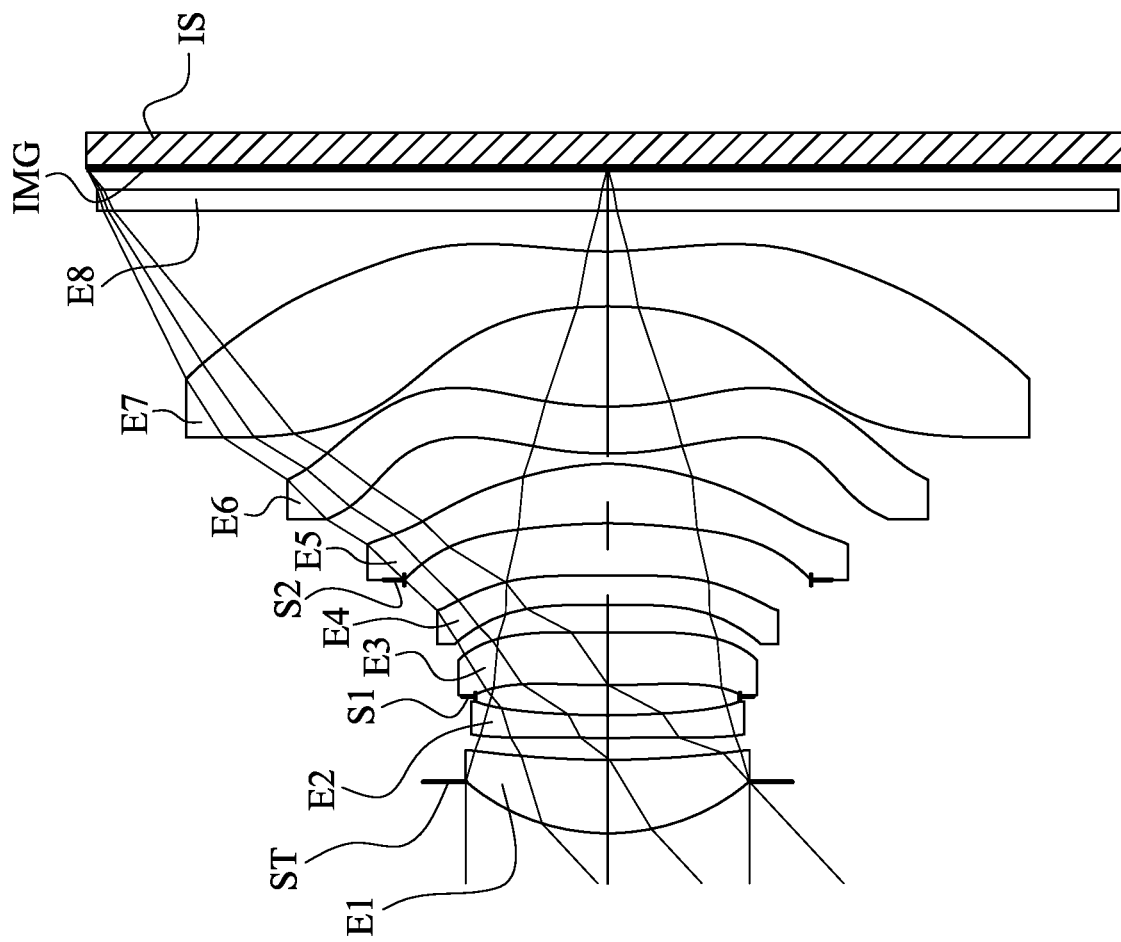
FIG. 15 is a schematic view of an imaging apparatus according to the 8th embodiment of the present disclosure.
Figure 16:
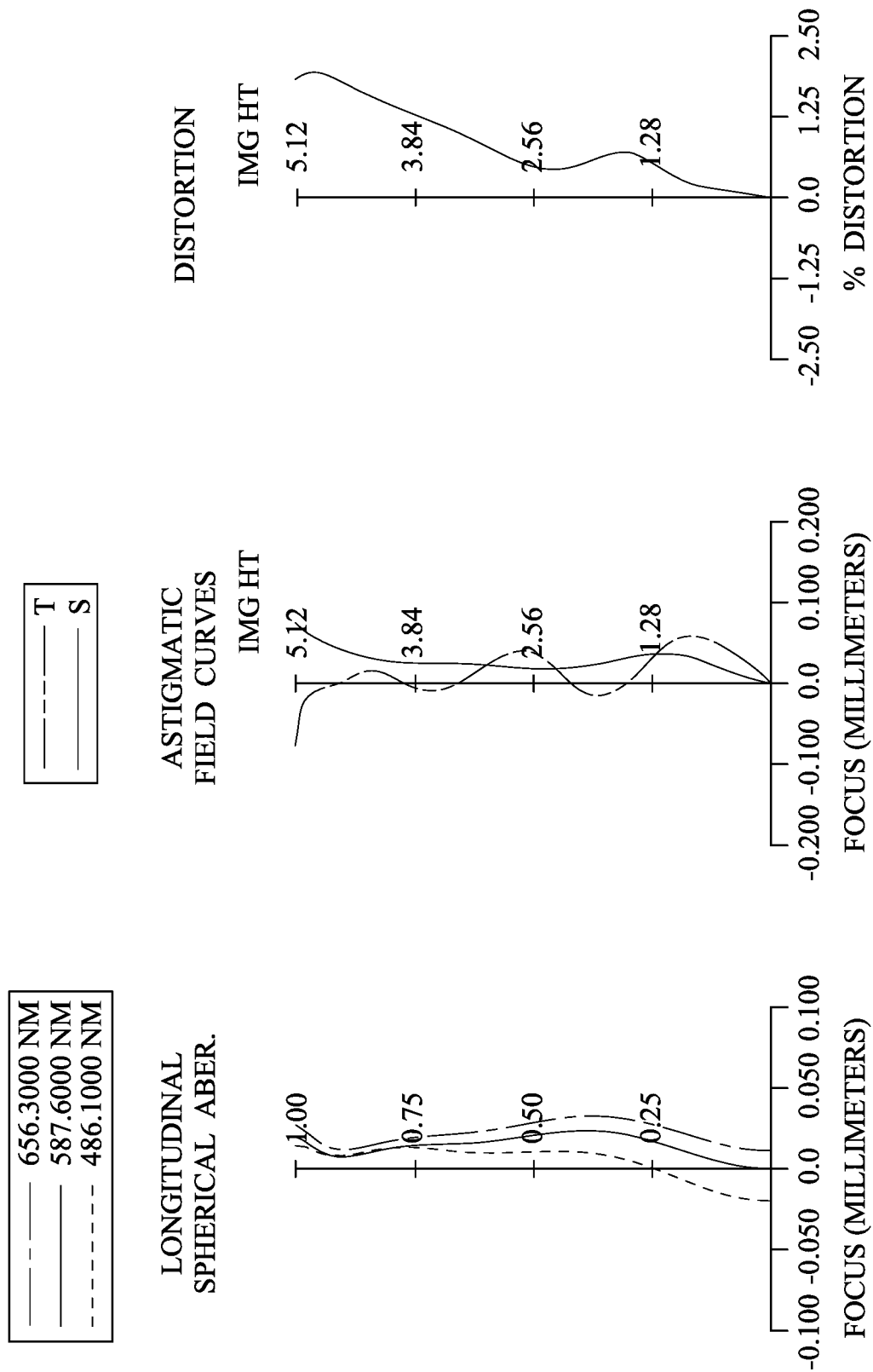
FIG. 16 shows spherical aberration curves, astigmatic field curves and a distortion curve of the imaging apparatus according to the 8th embodiment.

FIG. 15 is a schematic view of an imaging apparatus 8 according to the 8th embodiment of the present disclosure. FIG. 16 shows spherical aberration curves, astigmatic field curves and a distortion curve of the imaging apparatus 8 according to the 8th embodiment. In FIG. 15, the imaging apparatus 8 includes an optical imaging system assembly (its reference numeral is omitted) and an image sensor IS. The optical imaging system assembly includes, in order from an object side to an image side along an optical path, an aperture stop ST, a first lens element E1, a second lens element E2, a stop S1, a third lens element E3, a fourth lens element E4, a stop S2, a fifth lens element E5, a sixth lens element E6, a seventh lens element E7, a filter E8 and an image surface IMG, wherein the image sensor IS disposed on the image surface IMG of the optical imaging system assembly. The optical imaging system assembly includes seven lens elements (E1, E2, E3, E4, E5, E6, E7) without additional one or more lens elements inserted between the first lens element E1 and the seventh lens element E7.

The first lens element E1 with positive refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of a plastic material, and has the object-side surface and the image-side surface being both aspheric. Furthermore, the object-side surface of the second lens element E2 includes two inflection points.

The third lens element E3 with positive refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of a plastic material, and has the object-side surface and the image-side surface being both aspheric. Furthermore, the image-side surface of the fifth lens element E5 includes two inflection points.

The sixth lens element E6 with negative refractive power has an object-side surface being convex in a paraxial region thereof and an image-side surface being concave in a paraxial region thereof. The sixth lens element E6 is made of a plastic material, and has the object-side surface and the image-side surface being both aspheric. Furthermore, the object-side surface of the sixth lens element E6 includes two inflection points and one critical point in an off-axis region thereof, and the image-side surface of the sixth lens element E6 includes two inflection points and one critical point in an off-axis region thereof.

The seventh lens element E7 with negative refractive power has an object-side surface being concave in a paraxial region thereof and an image-side surface being concave in a paraxial region thereof. The seventh lens element E7 is made of a plastic material, and has the object-side surface and the image-side surface being both aspheric. Furthermore, the object-side surface of the seventh lens element E7 includes one inflection point, and the image-side surface of the seventh lens element E7 includes two inflection points and one critical point in an off-axis region thereof.

The filter E5 is made of a glass material, which is located between the seventh lens element E1 and the image surface IMG in order, and will not affect the focal length of the optical imaging system assembly.

The detailed optical data of the 8th embodiment are shown in Table 15 and the aspheric surface data are shown in Table 16 below.

TABLE 15

8th Embodiment
f = 5.41 mm, Fno = 1.94, HFOV = 42.9 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Ape. Stop | Plano |  | −0.506 |  |  |  |  |
| 2 | Lens 1 | 2.2176 | ASP | 0.722 | Plastic | 1.545 | 56.1 | 5.33 |
| 3 |  | 8.2855 | ASP | 0.217 |  |  |  |  |
| 4 | Lens 2 | 25.5361 | ASP | 0.221 | Plastic | 1.680 | 18.2 | −12.99 |
| 5 |  | 6.5417 | ASP | 0.185 |  |  |  |  |
| 6 | Stop | Plano |  | 0.115 |  |  |  |  |
| 7 | Lens 3 | 10.6224 | ASP | 0.518 | Plastic | 1.544 | 56.0 | 29.93 |
| 8 |  | 30.0238 | ASP | 0.270 |  |  |  |  |
| 9 | Lens 4 | 337.5472 | ASP | 0.290 | Plastic | 1.680 | 18.2 | 187.88 |
| 10 |  | −205.5078 | ASP | −0.044 |  |  |  |  |
| 11 | Stop | Plano |  | 0.556 |  |  |  |  |
| 12 | Lens 5 | −5.3824 | ASP | 0.586 | Plastic | 1.544 | 56.0 | 6.70 |
| 13 |  | −2.2569 | ASP | 0.104 |  |  |  |  |
| 14 | Lens 6 | 4.3773 | ASP | 0.460 | Plastic | 1.544 | 56.0 | −41.54 |
| 15 |  | 3.5312 | ASP | 0.985 |  |  |  |  |
| 16 | Lens 7 | −5.3930 | ASP | 0.541 | Plastic | 1.534 | 56.0 | −3.99 |
| 17 |  | 3.6535 | ASP | 0.400 |  |  |  |  |
| 18 | Filter | Plano |  | 0.210 | Glass | 1.517 | 64.2 | — |
| 19 |  | Plano |  | 0.209 |  |  |  |  |
| 20 | Image | Plano |  | — |  |  |  |  |

Reference wavelength is 587.6 nm (d-line).
Effective radius of Surface 6 (stop S1) is 1.300 mm.
Effective radius of Surface 11 (stop S2) is 2.000 mm.

TABLE 16

Aspheric Coefficients

| Surface # | 2 | 3 | 4 | 5 | 7 |
|---|---|---|---|---|---|
| k = | 2.03285E−01 | 8.98050E+00 | 9.73410E+01 | 5.84598E+00 | −9.27762E+01 |
| A4 = | 1.738775959E−03 | −1.870901198E−02 | −5.749579011E−02 | −6.154235219E−02 | −4.960974924E−02 |
| A6 = | −5.954807375E−03 | 1.816025759E−02 | 7.104715117E−02 | 7.731895312E−02 | 1.588132616E−02 |
| A8 = | 9.771430160E−03 | −2.074197600E−02 | −4.791732147E−02 | −5.282667387E−02 | −2.337075755E−02 |
| A10 = | −7.572205566E−03 | 2.285351782E−02 | 3.244772632E−02 | 3.675335095E−02 | 1.703615639E−02 |
| A12 = | 3.004213219E−03 | −1.695564866E−02 | −2.161207395E−02 | −2.402959852E−02 | −5.776051831E−03 |
| A14 = | 4.798802112E−04 | 6.899156066E−03 | 9.645335090E−03 | 1.007595687E−02 | −1.462167842E−03 |
| A16 = |  | −1.160509816E−03 | −1.784040281E−03 | −1.664504020E−03 | 8.325082946E−04 |

| Surface # | 8 | 9 | 10 | 12 | 13 |
|---|---|---|---|---|---|
| k = | 4.16885E+01 | 9.90000E+01 | 9.90000E+01 | −4.04058E+01 | −1.19636E+01 |
| A4 = | −7.516370315E−02 | −1.277865212E−01 | −7.082921695E−02 | −2.076995443E−02 | −2.638907813E−02 |
| A6 = | 4.726362031E−02 | 1.772205906E−01 | 3.594145756E−02 | 7.533921196E−02 | 3.195392026E−02 |
| A8 = | −8.028607264E−02 | −4.865305726E−01 | −8.977334082E−02 | −1.211428412E−01 | −5.097874565E−02 |
| A10 = | 7.362514723E−02 | 7.878695568E−01 | 1.180146327E−01 | 9.899442419E−02 | 4.060670068E−02 |
| A12 = | −3.364794462E−02 | −7.941367460E−01 | −8.971055453E−02 | −5.081874272E−02 | −1.881211473E−02 |
| A14 = | 6.260873002E−03 | 5.180969052E−01 | 4.521278490E−02 | 1.711032393E−02 | 5.384460693E−03 |
| A16 = | −2.288419794E−04 | −2.114359664E−01 | −1.503472982E−02. | −3.689482302E−03 | −9.498856076E−04 |

TABLE 16-continued

| Aspheric Coefficients | | | | |
|---|---|---|---|---|
| A18 = | 4.850589821E−02 | 2.914999860E−03 | 4.605308992E−04 | 9.901407159E−05 |
| A20 = | −4.732684837E−03 | −2.421659365E−04 | −2.508582569E−05 | −5.479821018E−06 |
| A22 = | | | | 1.196906637E−07 |

| Surface # | 14 | 15 | 16 | 17 |
|---|---|---|---|---|
| k = | 3.49434E−02 | 0.00000E+00 | −6.62405E−01 | −1.25373E+01 |
| A4 = | 5.570336803E−02 | −1.974636163E−02 | −9.570931086E−02 | −9.047799558E−02 |
| A6 = | −7.202212996E−02 | 4.183097059E−02 | 8.002559351E−02 | 6.972242136E−02 |
| A8 = | 1.922249223E−02 | −8.296191487E−02 | 5.181913521E−02 | −3.855146261E−02 |
| A10 = | 3.237635054E−03 | 6.813178923E−02 | 1.971695590E−02 | 1.358235381E−02 |
| A12 = | 4.185334235E−03 | −3.456306214E−02 | 4.471017679E−03 | −3.189183505E−03 |
| A14 = | 1.617765231E−03 | 1.205661353E−02 | 6.221249950E−04 | 5.209126110E−04 |
| A16 = | −3.795940173E−04 | −2.997777301E−03 | −4.944599476E−05 | −6.044013081E−05 |
| A18 = | 5.623207211E−05 | 5.359305557E−04 | 1.075300869E−06 | 4.984711706E−06 |
| A20 = | −4.657418619E−06 | −6.846729482E−05 | 2.242531152E−07 | −2.861844422E−07 |
| A22 = | 1.277236807E−07 | 6.132125416E−06 | −2.916293676E−08 | 1.082225988E−08 |
| A24 = | 7.815746611E−09 | −3.711365217E−07 | 1.792976250E−09 | −2.325285176E−10 |
| A26 = | −4.746614116E−10 | 1.418575059E−08 | −6.418331259E−11 | 1.238536323E−12 |
| A28 = | | −2.991036687E−10 | 1.286537796E−12 | 5.436807963E−14 |
| A30 = | | 2.467787437E−12 | −1.123406150E−14 | −8.958850434E−16 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.41 | \|f/f3\| + \|f/f4\| | 0.21 |
| Fno | 1.94 | f1/R1 + f1/R2 | 3.05 |
| HFOV [degrees] | 42.9 | f2/f | −2.40 |
| (V5 + V6)/V4 | 6.16 | f5/f | 1.24 |
| (CT1 + CT2 + CT3 + CT4 + CT5 + CT6)/T67 | 2.84 | f6/f1 | −7.79 |
| T23/T12 | 1.38 | f6/R11 + f6/R12 | −21.25 |
| T67/T23 | 3.28 | f7/R13 + f7/R14 | −0.35 |
| TUEPD | 2.35 | Y72/Y11 | 2.97 |
| TL/f | 1.21 | Yc61/Y61 | 0.50 |
| TL/ImgH | 1.28 | Yc62/Y62 | 0.47 |
| ΣAT/T23 | 7.96 | Yc72/Y72 | 0.30 |
| ΣCT/ΣAT | 1.40 | | |

9th Embodiment

Figure 18:
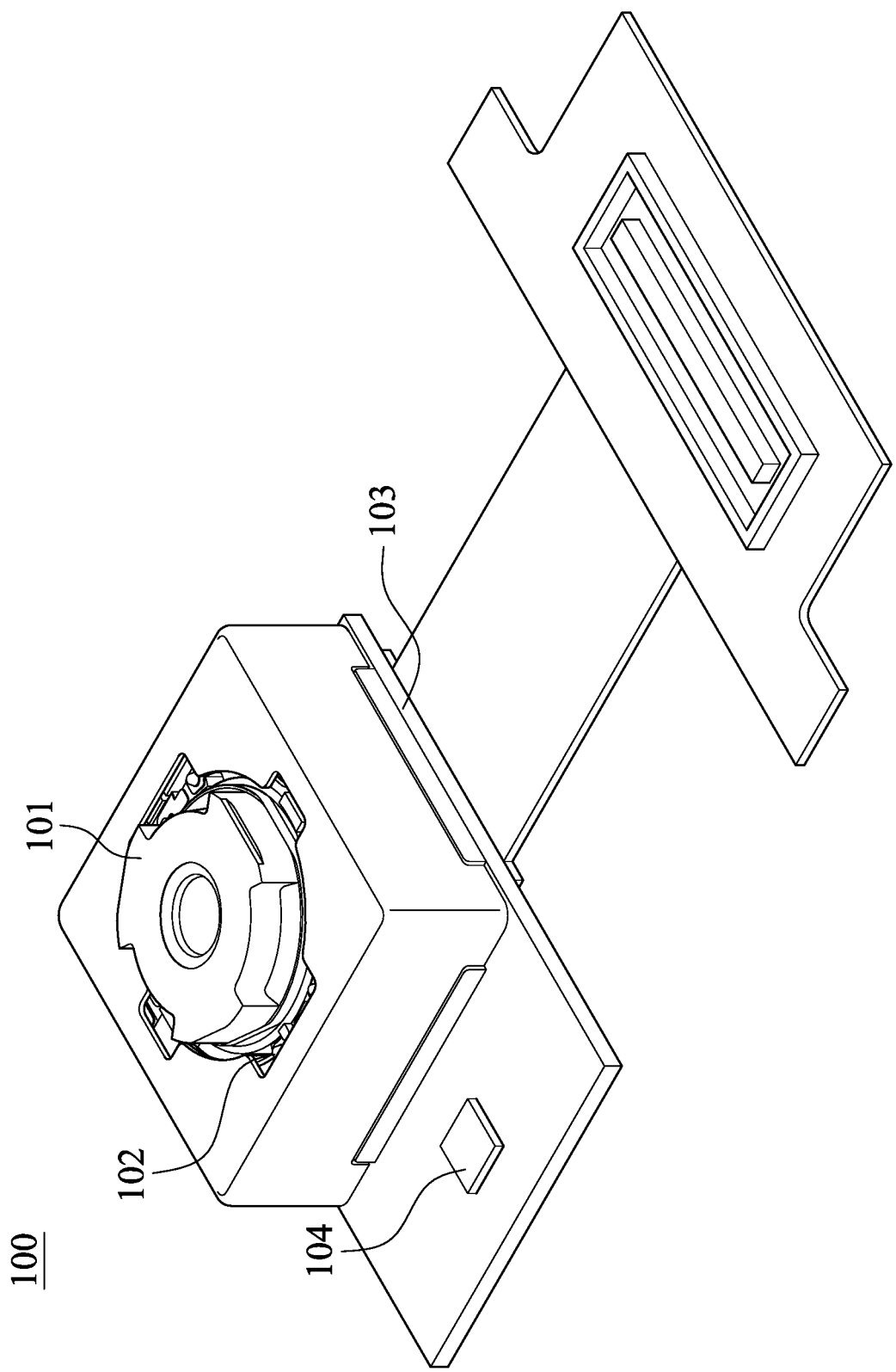
FIG. 18 is a schematic view of an imaging apparatus according to the 9th embodiment of the present disclosure.

FIG. 18 is a schematic view of an imaging apparatus 100 according to the 9th embodiment of the present disclosure. In FIG. 18, the imaging apparatus 100 of the 9th embodiment is a camera module, the imaging apparatus 100 includes an imaging lens assembly 101, a driving apparatus 102 and an image sensor 103, wherein the imaging lens assembly 101 includes the optical imaging system assembly of the present disclosure and a lens barrel (not shown in drawings) for carrying the optical imaging system assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The optical imaging system assembly can obtain a favorable imaging position by the driving apparatus 102 so as to capture clear images when the imaged object is disposed at different object distances.

The imaging apparatus 100 can include the image sensor 103 located on the image surface of the optical imaging system assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 9th embodiment, the image stabilization module 104 is a gyro sensor, but is not limited thereto. Therefore, the variation of different axial directions of the optical imaging system assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 19A:
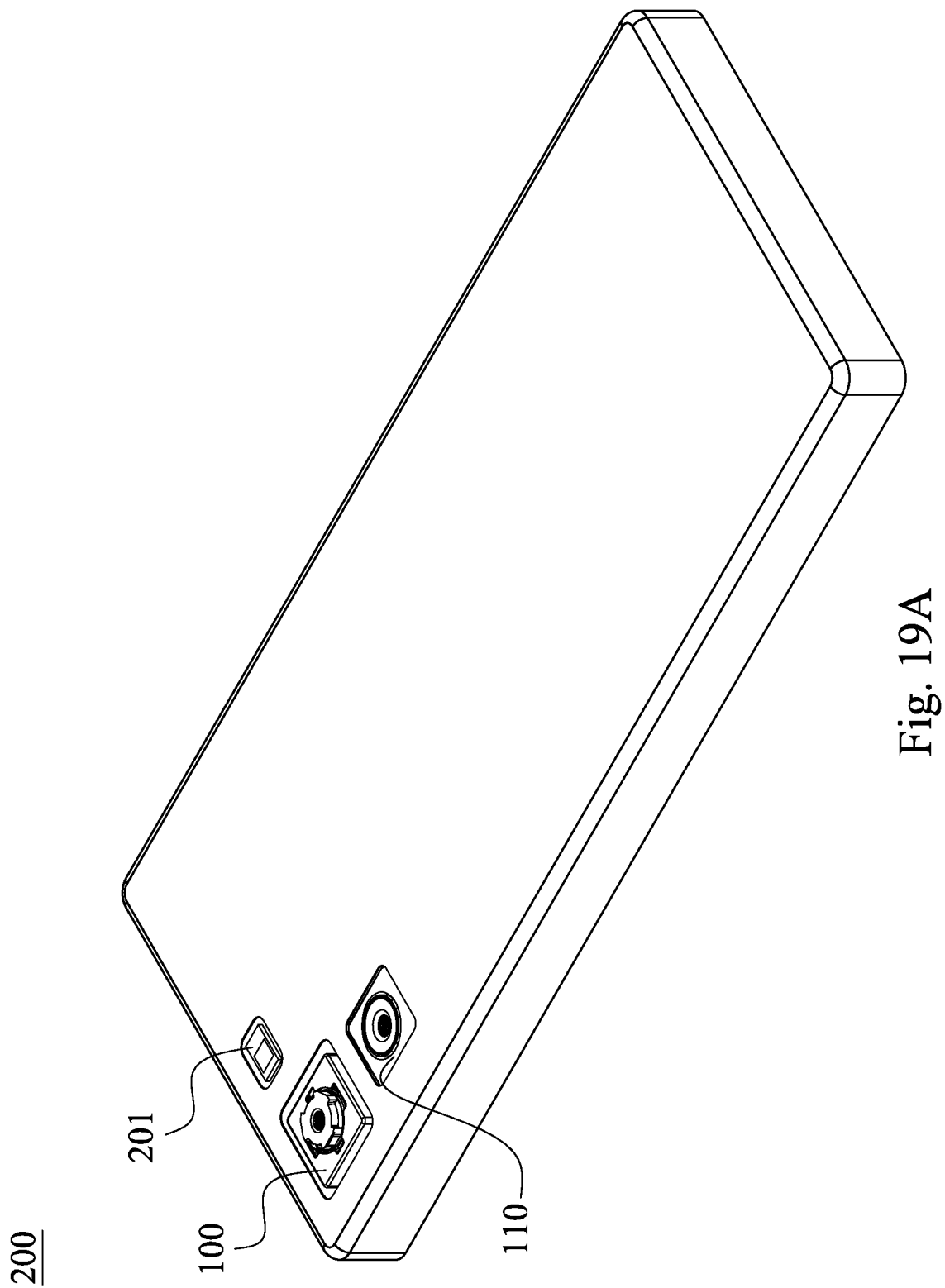
FIG. 19A is a schematic view of one side of an electronic device according to the 10th embodiment of the present disclosure.
Figure 19B:
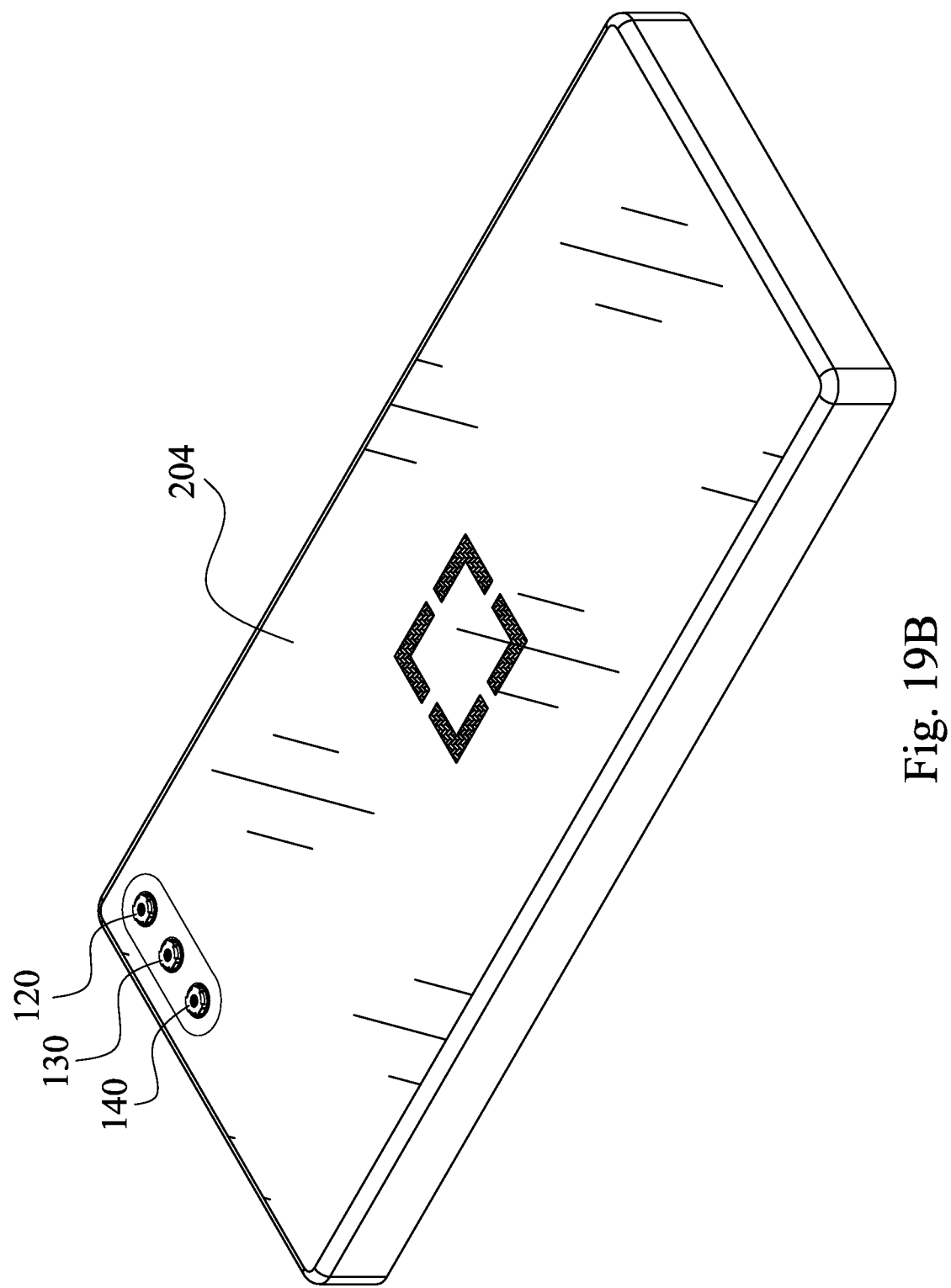
FIG. 19B is a schematic view of another side of the electronic device of FIG. 19A.
Figure 19C:
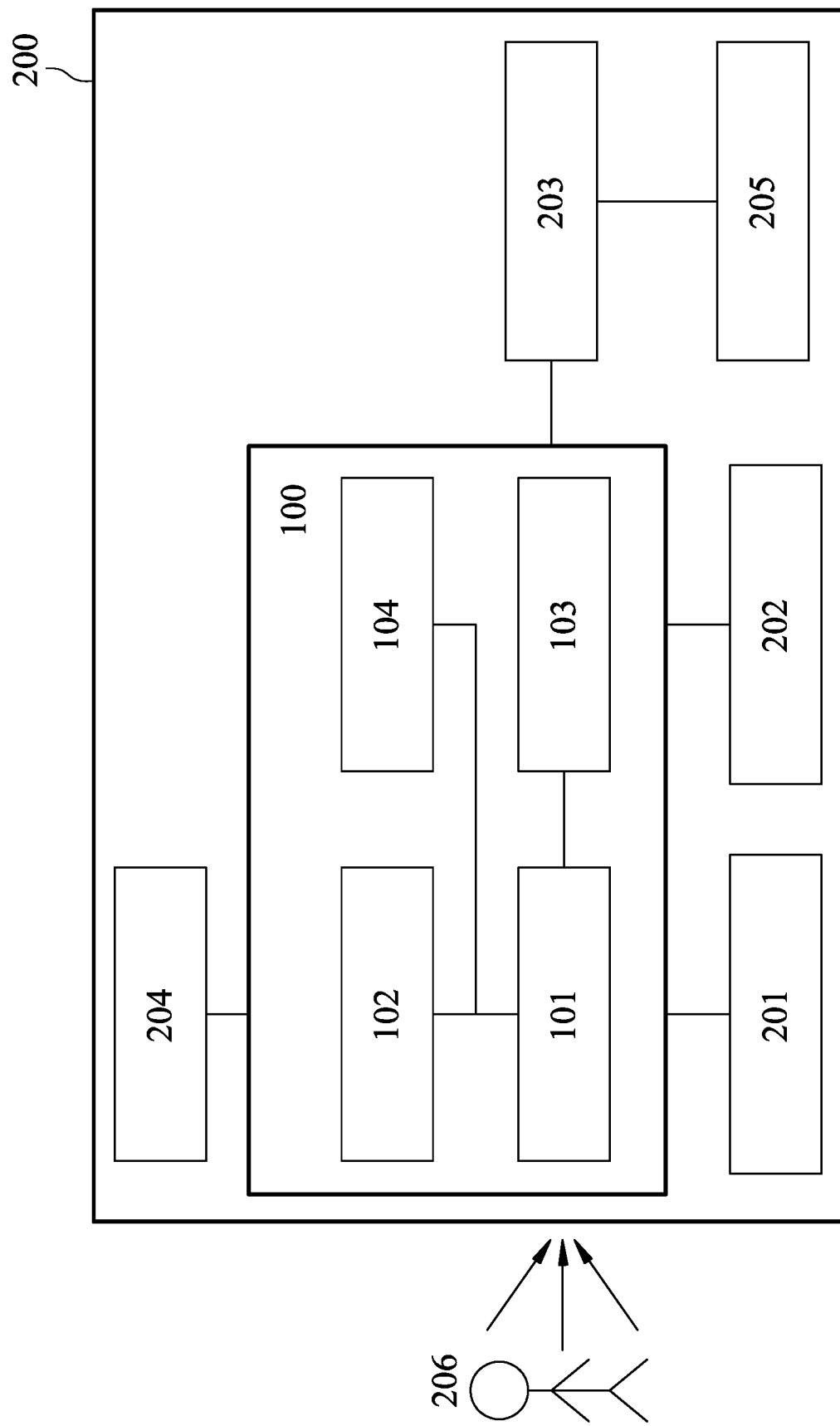
FIG. 19C is a system schematic view of the electronic device of FIG. 19A.

FIG. 19A is a schematic view of one side of an electronic device 200 according to the 10th embodiment of the present disclosure. FIG. 19B is a schematic view of another side of the electronic device 200 of FIG. 19A. FIG. 19C is a system schematic view of the electronic device 200 of FIG. 19A. In FIGS. 19A, 19B and 19C, the electronic device 200 according to the 10th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 10th embodiment can include the optical imaging system assembly of the present disclosure, and can be the same or similar to the imaging apparatus 100 according to the aforementioned 9th embodiment, and will not describe again herein. In detail, according to the 10th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 19C, or can be adaptively adjusted according to the type of the imaging apparatuses, which will not be shown and detailed descripted again.

11th Embodiment

Figure 20:
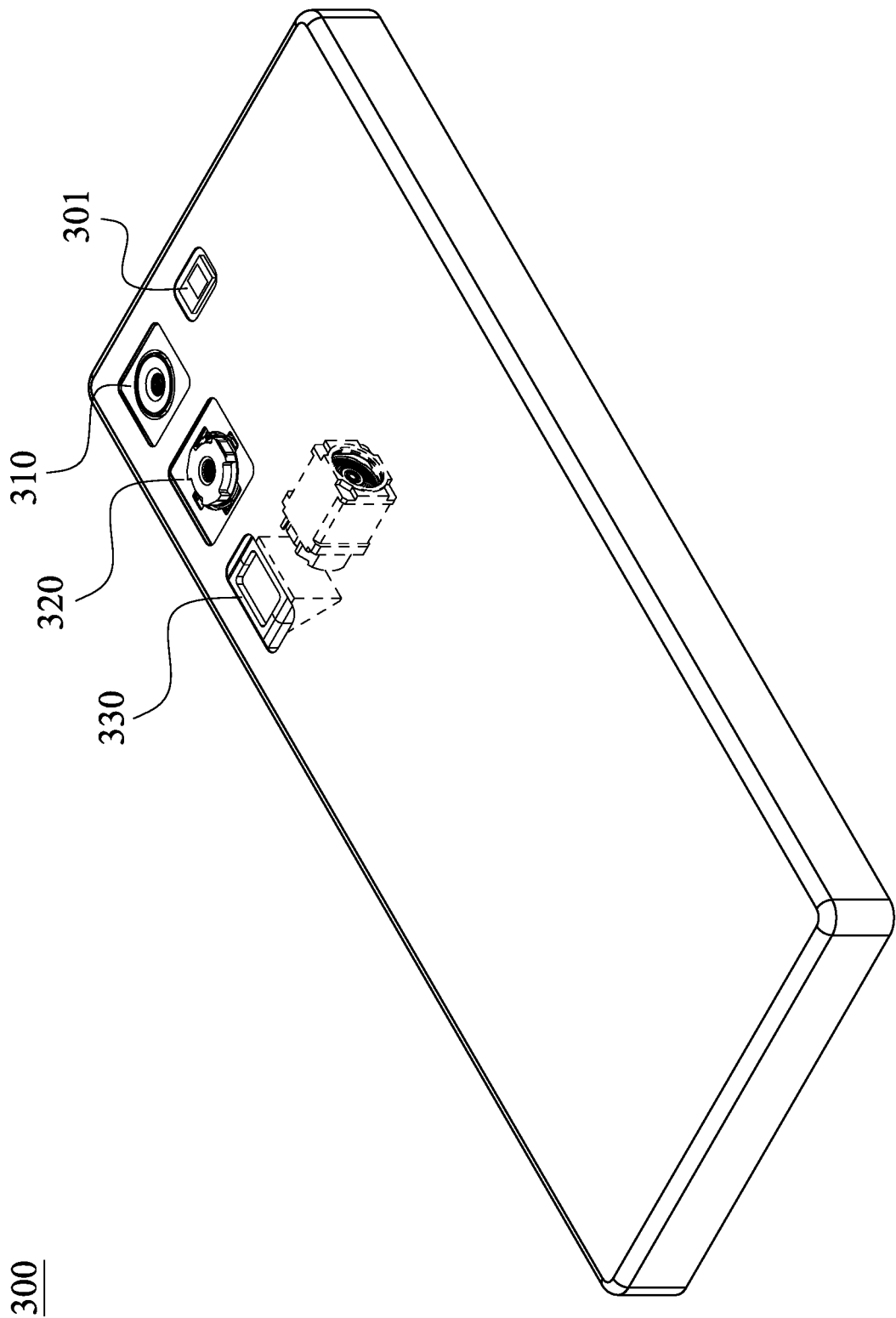
FIG. 20 is a schematic view of one side of an electronic device according to the 11th embodiment of the present disclosure.

FIG. 20 is a schematic view of one side of an electronic device 300 according to the 11th embodiment of the present disclosure. According to the 11th embodiment, the electronic device 300 is a smartphone, which include imaging apparatuses 310, 320, 330 and a flash module 301.

The electronic device 300 according to the 11th embodiment can include the same or similar elements to that according to the 10th embodiment, and each of the imaging apparatuses 310, 320, 330 according to the 11th embodiment can have a configuration which is the same or similar to that according to the 10th embodiment, and will not describe again herein. In detail, according to the 11th embodiment, each of the imaging apparatuses 310, 320, 330 can include the optical imaging system assembly of the present disclosure, and can be the same or similar to the imaging apparatus 100 according to the aforementioned 9th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

12th Embodiment

Figure 21:
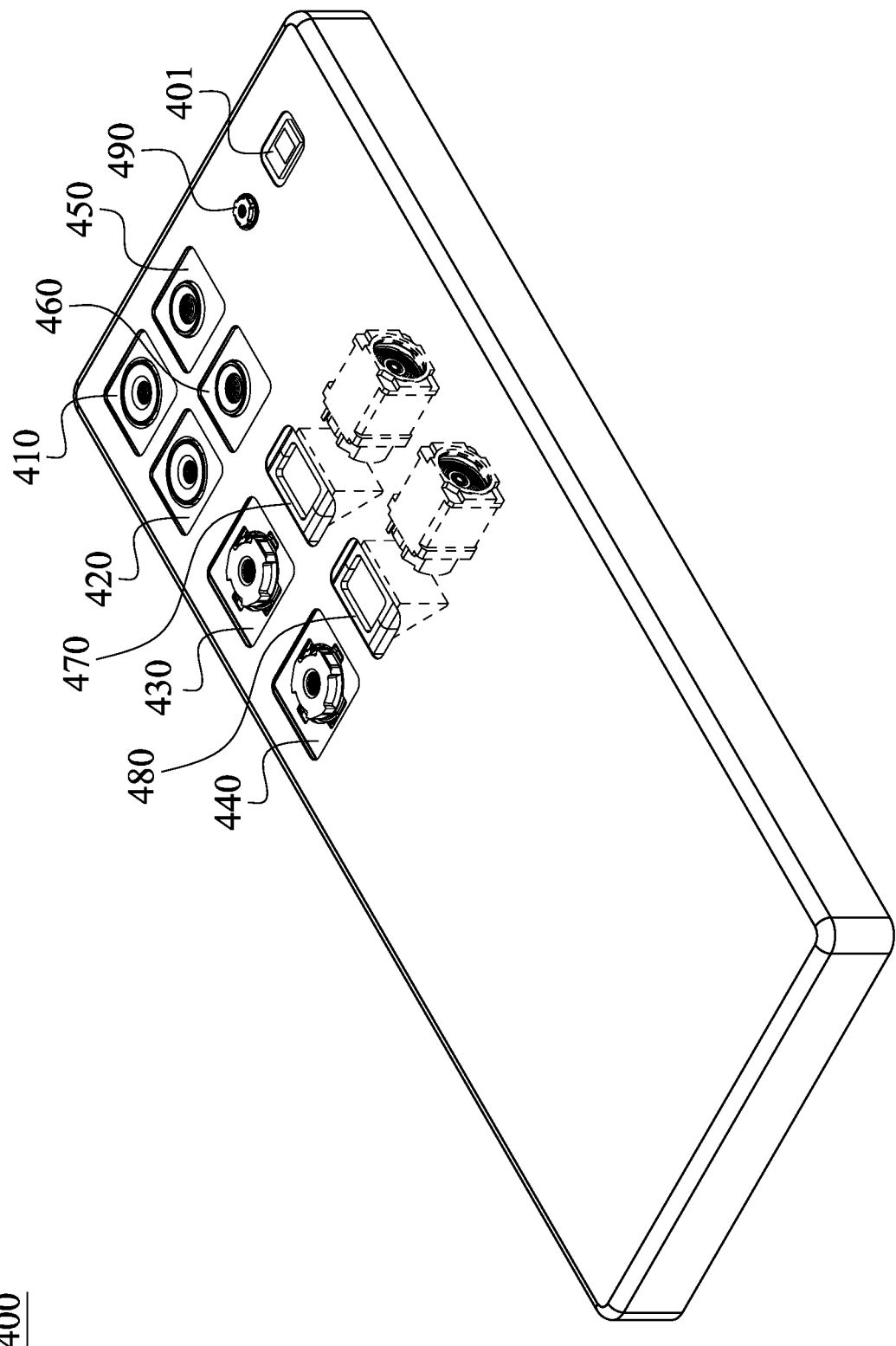
FIG. 21 is a schematic view of one side of an electronic device according to the 12th embodiment of the present disclosure.

FIG. 21 is a schematic view of one side of an electronic device 400 according to the 12th embodiment of the present disclosure. According to the 12th embodiment, the electronic device 400 is a smartphone, which include imaging apparatuses 410, 420, 430, 440, 450, 460, 470, 480, 490 and a flash module 401.

The electronic device 400 according to the 12th embodiment can include the same or similar elements to that according to the 10th embodiment, and each of the imaging apparatuses 410, 420, 430, 440, 450, 460, 470, 480, 490 and the flash module 401 can have a configuration which is the same or similar to that according to the 10th embodiment, and will not describe again herein. In detail, according to the 12th embodiment, each of the imaging apparatuses 410, 420, 430, 440, 450, 460, 470, 480, 490 can include the optical imaging system assembly of the present disclosure, and can be the same or similar to the imaging apparatus 100 according to the aforementioned 9th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system assembly comprising seven lens elements, the seven lens elements being, in order from an object side to an image side along an optical path:
    a first lens element, a second lens element, a third lens element, a fourth lens element, a fifth lens element, a sixth lens element and a seventh lens element; each of the seven lens elements has an object-side surface towards the object side and an image-side surface towards the image side;
    wherein the second lens element has negative refractive power;
    the object-side surface of the third lens element is convex in a paraxial region thereof;
    the image-side surface of the fifth lens element is convex in a paraxial region thereof;
    the sixth lens element has negative refractive power, the object-side surface of the sixth lens element is convex in a paraxial region thereof, the image-side surface of the sixth lens element is concave in a paraxial region thereof, and
    the seventh lens element has negative refractive power;
    wherein at least one of the object-side surface and the image-side surface of at least one of the first lens element to the seventh lens element comprises at least one inflection point;
    wherein an Abbe number of the fourth lens element is V4, an Abbe number of the fifth lens element is V5, an Abbe number of the sixth lens element is V6, an axial distance between the first lens element and the second lens element is T12, an axial distance between the second lens element and the third lens element is T23, and the following conditions are satisfied:

$4.4<(V5+V6)/V4<12$; and $0.70<T23/T12<3.6$.

2. The optical imaging system assembly of claim 1, wherein the Abbe number of the fourth lens element is V4, the Abbe number of the fifth lens element is V5, the Abbe number of the sixth lens element is V6, and the following condition is satisfied:

$4.9<(V5+V6)/V4<11$.

3. The optical imaging system assembly of claim 1, wherein the axial distance between the first lens element and the second lens element is T12, the axial distance between the second lens element and the third lens element is T23, and the following condition is satisfied:

$1.1<T23/T12<1.8$.

4. The optical imaging system assembly of claim 1, wherein a sum of all axial distances between adjacent lens elements of the optical imaging system assembly is ΣAT, the axial distance between the second lens element and the third lens element is T23, a sum of central thicknesses of all lens elements of the optical imaging system assembly is ΣCT, and the following conditions are satisfied:

$5.5<\Sigma AT/T23<14$; and $1.3<\Sigma CT/\Sigma AT<1.6$.

5. The optical imaging system assembly of claim 1, wherein a focal length of the optical imaging system assembly is f, a focal length of the second lens element is f2, and the following condition is satisfied:

$-3.5<f2/f<-2.0$.

6. The optical imaging system assembly of claim 1, wherein a focal length of the sixth lens element is f6, a curvature radius of the object-side surface of the sixth lens element is R11, a curvature radius of the image-side surface of the sixth lens element is R12, and the following condition is satisfied:

$-25<f6/R11+f6/R12<-18$.

7. The optical imaging system assembly of claim 1, wherein an f-number of the optical imaging system assembly is Fno, half of a maximum field of view of the optical imaging system assembly is HFOV, and the following conditions are satisfied:

$1.3<Fno<2.4$; and $35.0$ degrees $<HFOV<50.0$ degrees.

8. The optical imaging system assembly of claim 1, wherein the first lens element has positive refractive power; a focal length of the first lens element is f1, a focal length of the sixth lens element is f6, and the following condition is satisfied:

$-13<f6/f1<-6.7$.

9. The optical imaging system assembly of claim 1, wherein the object-side surface of the first lens element is convex in a paraxial region thereof, a distance between at least one critical point of the image-side surface of the sixth lens element and an optical axis is Yc62, a maximum distance between an optical effective region of the image-side surface of the sixth lens element and the optical axis is Y62, and the following condition is satisfied:

$0.25<Yc62/Y62<0.70$.

10. An optical imaging system assembly comprising seven lens elements, the seven lens elements being, in order from an object side to an image side along an optical path:
a first lens element, a second lens element, a third lens element, a fourth lens element, a fifth lens element, a sixth lens element and a seventh lens element; each of the seven lens elements has an object-side surface towards the object side and an image-side surface towards the image side;
wherein the first lens element has positive refractive power;
the object-side surface of the third lens element is convex in a paraxial region thereof,
the fifth lens element has positive refractive power, the object-side surface of the fifth lens element is concave in a paraxial region thereof, the image-side surface of the fifth lens element is convex in a paraxial region thereof;
the object-side surface of the sixth lens element is convex in a paraxial region thereof; and
the object-side surface of the seventh lens element is concave in a paraxial region thereof;
wherein at least one of the object-side surface and the image-side surface of at least one of the first lens element to the seventh lens element comprises at least one inflection point;
wherein an Abbe number of the fourth lens element is V4, an Abbe number of the fifth lens element is V5, an Abbe number of the sixth lens element is V6, an axial distance between the second lens element and the third lens element is T23, an axial distance between the sixth lens element and the seventh lens element is T67, and the following conditions are satisfied:

$5.3<(V5+V6)/V4<10$; and $2.1<T67/T23<5.4$.

11. The optical imaging system assembly of claim 10, wherein the Abbe number of the fourth lens element is V4, the Abbe number of the fifth lens element is V5, the Abbe number of the sixth lens element is V6, and the following condition is satisfied:

$5.7<(V5+V6)/V4<9.0$.

12. The optical imaging system assembly of claim 10, wherein the axial distance between the second lens element and the third lens element is T23, the axial distance between the sixth lens element and the seventh lens element is T67, a focal length of the optical imaging system assembly is f, a focal length of the third lens element is f3, a focal length of the fourth lens element is f4, and the following conditions are satisfied:

$2.4<T67/T23<4.8$; and $|f/f3|+|f/f4|<0.75$.

13. The optical imaging system assembly of claim 10, wherein an axial distance between the object-side surface of the first lens element and an image surface is TL, an entrance pupil diameter of the optical imaging system assembly is EPD, a maximum image height of the optical imaging system assembly is ImgH, and the following conditions are satisfied:

$$1.8 < TL/EPD < 2.5; \text{ and}$$

$$1.0 < TL/\text{ImgH} < 1.6.$$

14. The optical imaging system assembly of claim 10, wherein a focal length of the first lens element is f1, a curvature radius of the object-side surface of the first lens element is R1, a curvature radius of the image-side surface of the first lens element is R2, and the following condition is satisfied:

$$2.9 < f1/R1 + f1/R2 < 3.6.$$

15. The optical imaging system assembly of claim 10, wherein the object-side surface of the first lens element is convex in a paraxial region thereof, the image-side surface of the first lens element is concave in a paraxial region thereof, the sixth lens element has negative refractive power.

16. The optical imaging system assembly of claim 10, wherein the sixth lens element has negative refractive power; a focal length of the first lens element is f1, a focal length of the sixth lens element is f6, and the following condition is satisfied:

$$-13 < f6/f1 < -6.7.$$

17. The optical imaging system assembly of claim 10, wherein the seventh lens element has negative refractive power, the image-side surface of the seventh lens element is concave in a paraxial region thereof; a distance between at least one critical point of the image-side surface of the seventh lens element and an optical axis is Yc72, a maximum distance between an optical effective region of the image-side surface of the seventh lens element and the optical axis is Y72, and the following condition is satisfied:

$$0.10 < Yc72/Y72 < 0.50.$$

18. An optical imaging system assembly comprising seven lens elements, the seven lens elements being, in order from an object side to an image side along an optical path:
a first lens element, a second lens element, a third lens element, a fourth lens element, a fifth lens element, a sixth lens element and a seventh lens element; each of the seven lens elements has an object-side surface towards the object side and an image-side surface towards the image side;
wherein the object-side surface of the first lens element is convex in a paraxial region thereof, the image-side surface of the first lens element is concave in a paraxial region thereof;
the object-side surface of the third lens element is convex in a paraxial region thereof;
the fifth lens element has positive refractive power;
the sixth lens element has negative refractive power; and
the seventh lens element has negative refractive power;
wherein at least one of the object-side surface and the image-side surface of at least one of the first lens element to the seventh lens element comprises at least one inflection point;
wherein an Abbe number of the fourth lens element is V4, an Abbe number of the fifth lens element is V5, an Abbe number of the sixth lens element is V6, a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, an axial distance between the sixth lens element and the seventh lens element is T67, and the following conditions are satisfied:

$$4.4 < (V5+V6)/V4 < 12; \text{ and}$$

$$1.0 < (CT1+CT2+CT3+CT4+CT5+CT6)/T67 < 3.5.$$

19. The optical imaging system assembly of claim 18, wherein the Abbe number of the fourth lens element is V4, the Abbe number of the fifth lens element is V5, the Abbe number of the sixth lens element is V6, the central thickness of the first lens element is CT1, the central thickness of the second lens element is CT2, the central thickness of the third lens element is CT3, the central thickness of the fourth lens element is CT4, the central thickness of the fifth lens element is CT5, the central thickness of the sixth lens element is CT6, the axial distance between the sixth lens element and the seventh lens element is T67, and the following conditions are satisfied:

$$4.9 < (V5+V6)/V4 < 11; \text{ and}$$

$$2.0 < (CT1+CT2+CT3+CT4+CT5+CT6)/T67 < 3.2.$$

20. The optical imaging system assembly of claim 18, wherein an axial distance between the object-side surface of the first lens element and an image surface is TL, a focal length of the optical imaging system assembly is f, a focal length of the fifth lens element is f5, and the following conditions are satisfied:

$$1.1 < TL/f < 1.4; \text{ and}$$

$$0.90 < f5/f < 1.4.$$

21. The optical imaging system assembly of claim 18, wherein a focal length of the seventh lens element is f7, a curvature radius of the object-side surface of the seventh lens element is R13, a curvature radius of the image-side surface of the seventh lens element is R14, and the following condition is satisfied:

$$-1.2 < f7/R13 + f7/R14 < 0.$$

22. The optical imaging system assembly of claim 18, wherein the first lens element has positive refractive power; a focal length of the first lens element is f1, a focal length of the sixth lens element is f6, and the following condition is satisfied:

$$-13 < f6/f1 < -6.7.$$

23. The optical imaging system assembly of claim 18, wherein the second lens element has negative refractive power, the image-side surface of the second lens element is concave in a paraxial region thereof; the object-side surface of the fifth lens element is concave in a paraxial region thereof; the image-side surface of the fifth lens element is convex in a paraxial region thereof.

24. The optical imaging system assembly of claim 18, wherein the object-side surface of the sixth lens element is convex in a paraxial region thereof, a distance between at least one critical point of the object-side surface of the sixth lens element and an optical axis is Yc61, a maximum distance between an optical effective region of the object-side surface of the sixth lens element and the optical axis is Y61, and the following condition is satisfied:

$$0.30 < Yc61/Y61 < 0.75.$$

25. The optical imaging system assembly of claim 18, wherein at least one of the object-side surface and the image-side surface of each of at least two of the first lens element to the seventh lens element comprises at least one inflection point; a maximum distance between an optical effective region of the object-side surface of the first lens element and an optical axis is Y11, a maximum distance between an optical effective region of the image-side surface of the seventh lens element and the optical axis is Y72, and the following condition is satisfied:

$2.0 < Y72/Y11 < 4.0$.

26. An imaging apparatus, comprising:
    the optical imaging system assembly of claim 18; and
    an image sensor disposed on an image surface of the optical imaging system assembly.
27. An electronic device, comprising:
    the imaging apparatus of claim 26.

* * * * *